United States Patent [19]

Matsumoto et al.

[11] Patent Number: 5,675,750

[45] Date of Patent: *Oct. 7, 1997

[54] INTERFACE HAVING A BUS MASTER ARBITRATOR FOR ARBITRATING OCCUPATION AND RELEASE OF A COMMON BUS BETWEEN A HOST PROCESSOR AND A GRAPHICS SYSTEM PROCESSOR

[75] Inventors: John F. Matsumoto, Encinitas, Calif.; Motoaki Ando, Tokyo, Japan

[73] Assignees: Toshiba America Information Systems, Irvine, Calif.; Kabushiki Kaisha Toshiba, Kawasaki, Japan

[ * ] Notice: The term of this patent shall not extend beyond the expiration date of Pat. No. 5,438,663.

[21] Appl. No.: 418,598

[22] Filed: Apr. 6, 1995

Related U.S. Application Data

[62] Division of Ser. No. 150,779, Nov. 12, 1993, Pat. No. 5,438,663.

[51] Int. Cl.[6] ............................................. G06F 15/00
[52] U.S. Cl. .................................... 395/309; 395/726
[58] Field of Search ................................. 395/162, 309, 395/293, 299, 726

[56] References Cited

U.S. PATENT DOCUMENTS

| | | | |
|---|---|---|---|
| 4,958,378 | 9/1990 | Bell | 382/34 |
| 5,046,023 | 9/1991 | Katsura et al. | 395/162 |
| 5,119,494 | 6/1992 | Garman | 395/700 |
| 5,293,621 | 3/1994 | White et al. | 395/650 |
| 5,319,388 | 6/1994 | Mattison et al. | 345/190 |
| 5,369,744 | 11/1994 | Fukushima et al. | 395/162 |
| 5,438,663 | 8/1995 | Matsumoto et al. | 395/162 |
| 5,463,739 | 10/1995 | Albaugh et al. | 395/296 |
| 5,467,295 | 11/1995 | Young et al. | 395/200.05 |

OTHER PUBLICATIONS inmos, "XGA Software Programmer's Guide", First Edition 1991, 72OEK 258 00 (Sep. 1991).

Texas Instruments, "TMS34020, TMS34020A, Graphics System Processors", SPVS004B (Mar.1991–Revised Oct. 1990).

Texas Instruments, "TMS34020 User's Guide", 2564006-9721 revision (Aug. 1990).

*Primary Examiner*—Jack B. Harvey
*Assistant Examiner*—David A. Wiley
*Attorney, Agent, or Firm*—Banner & Witcoff, Ltd.

[57] ABSTRACT

An interface for a high-performance graphics adapter is provided. In a computer system which includes a host processor, a coprocessor in the form of a graphics system processor, and memory addressable by both the host and coprocessors. An application computer program running on the host processor utilizes a graphics operating system, such as an Extended Graphics Array Input/Output System (XGA BIOS) to write graphics data in XGA format to the memory. A controller translates memory addresses generated by the XGA BIOS (and hence the host processor) into memory addresses recognized by the coprocessor. One or more graphics controllers selectively swap pixel data between Intel order and Motorola order and store the graphics data, into an XGA video-random-access memory (RAM) buffer. A back-end gate array parallel-serial converts input display data in units of designated pixel data, and the graphics data is displayed on a CRT.

11 Claims, 22 Drawing Sheets

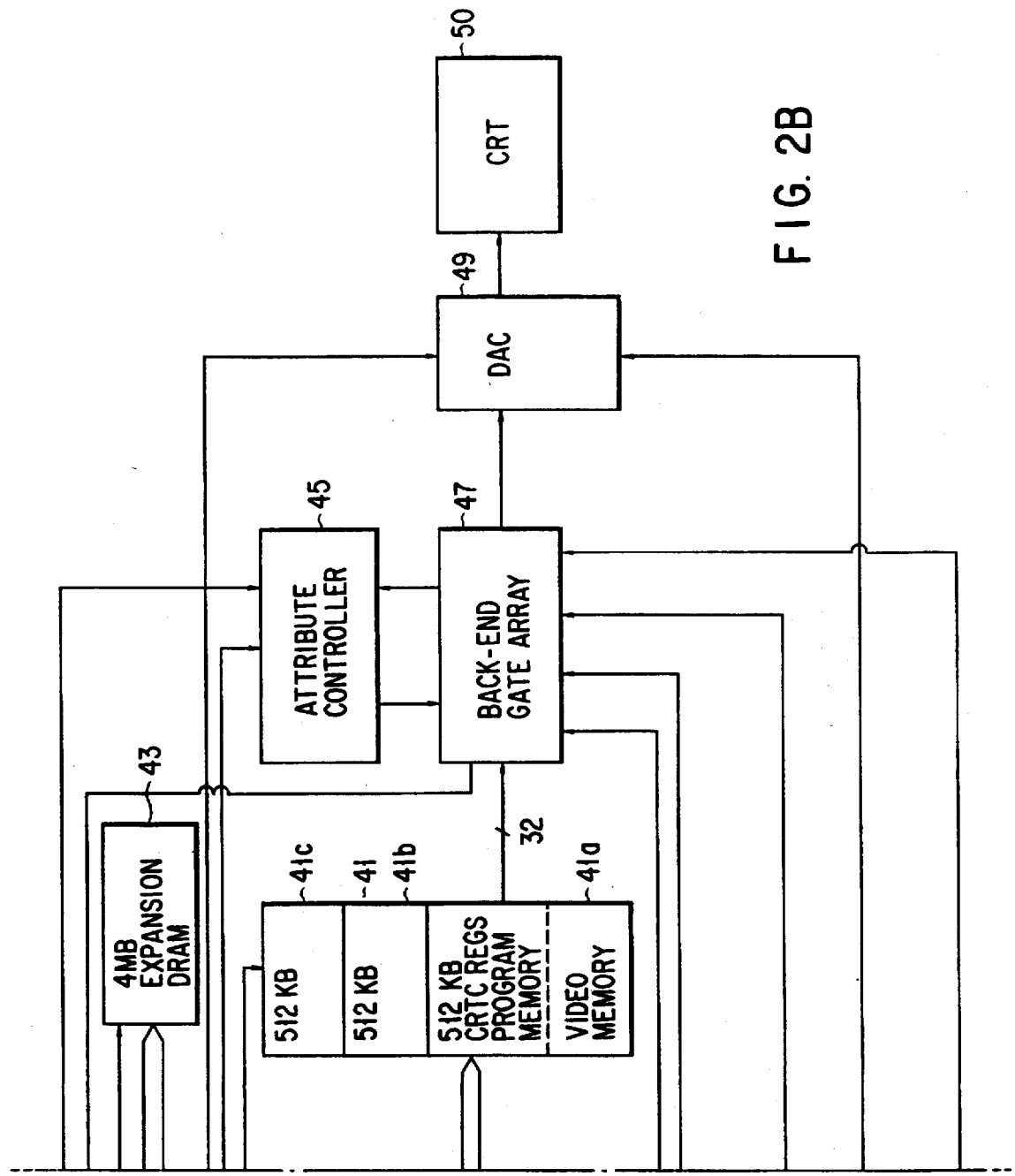

VIDEO MEMORY FORMAT (INTEL ORDER)

| | BYTE = n+2 | BYTE = n+1 | BYTE = n+0 |
|---|---|---|---|
| | 7 6 5 4 3 2 1 0 | 7 6 5 4 3 2 1 0 | 7 6 5 4 3 2 1 0 |
| Pixel Size = 1bpp pixel number bit significance | 23 22 21 20 19 18 17 16<br>0 0 0 0 0 0 0 0 | 15 14 13 12 11 10 9 8<br>0 0 0 0 0 0 0 0 | 7 6 5 4 3 2 1 0<br>0 0 0 0 0 0 0 0 |
| Pixel Size = 2bpp pixel number bit significance | 11 11 10 10 9 9 8 8<br>1 0 1 0 1 0 1 0 | 7 7 6 6 5 5 4 4<br>1 0 1 0 1 0 1 0 | 3 3 2 2 1 1 0 0<br>1 0 1 0 1 0 1 0 |
| Pixel Size = 4bpp pixel number bit significance | 5 5 5 5 4 4 4 4<br>3 2 1 0 3 2 1 0 | 3 3 3 3 2 2 2 2<br>3 2 1 0 3 2 1 0 | 1 1 1 1 0 0 0 0<br>3 2 1 0 3 2 1 0 |
| Pixel Size = 8bpp pixel number bit significance | 2 2 2 2 2 2 2 2<br>7 6 5 4 3 2 1 0 | 1 1 1 1 1 1 1 1<br>7 6 5 4 3 2 1 0 | 0 0 0 0 0 0 0 0<br>7 6 5 4 3 2 1 0 |
| Pixel Size = 16bpp pixel number bit significance | 1 1 1 1 1 1 1 1<br>7 6 5 4 3 2 1 0 | 1 1 1 1 1 1 1 1<br>15 14 13 12 11 10 9 8 | 0 0 0 0 0 0 0 0<br>7 6 5 4 3 2 1 0 |
| | | 0 0 0 0 0 0 0 0<br>15 14 13 12 11 10 9 8 | 0 0 0 0 0 0 0 0<br>7 6 5 4 3 2 1 0 |

FIG. 8

VIDEO MEMORY FORMAT (MOTOROLA FORMAT)

| | BYTE = n+0 | BYTE = n+1 | BYTE = n+2 |
|---|---|---|---|
| | 7 6 5 4 3 2 1 0 | 7 6 5 4 3 2 1 0 | 7 6 5 4 3 2 1 0 |
| Pixel Size = 1bpp<br>pixel number<br>bit significance | 0 1 2 3 4 5 6 7<br>0 0 0 0 0 0 0 0 | 8 9 10 11 12 13 14 15<br>0 0 0 0 0 0 0 0 | 16 17 18 19 20 21 22 23<br>0 0 0 0 0 0 0 0 |
| Pixel Size = 2bpp<br>pixel number<br>bit significance | 0 0 1 1 2 2 3 3<br>1 0 1 0 1 0 1 0 | 4 4 5 5 6 6 7 7<br>1 0 1 0 1 0 1 0 | 8 8 9 9 10 10 11 11<br>1 0 1 0 1 0 1 0 |
| Pixel Size = 4bpp<br>pixel number<br>bit significance | 0 0 0 0 1 1 1 1<br>3 2 1 0 3 2 1 0 | 2 2 2 2 3 3 3 3<br>3 2 1 0 3 2 1 0 | 4 4 4 4 5 5 5 5<br>3 2 1 0 3 2 1 0 |
| Pixel Size = 8bpp<br>pixel number<br>bit significance | 0 0 0 0 0 0 0 0<br>7 6 5 4 3 2 1 0 | 1 1 1 1 1 1 1 1<br>7 6 5 4 3 2 1 0 | 2 2 2 2 2 2 2 2<br>7 6 5 4 3 2 1 0 |
| Pixel Size = 16bpp<br>pixel number<br>bit significance | 0 0 0 0 0 0 0 0<br>15 14 13 12 11 10 9 8 | 0 0 0 0 0 0 0 0<br>7 6 5 4 3 2 1 0 | 1 1 1 1 1 1 1 1<br>15 14 13 12 11 10 9 8 |

FIG. 9

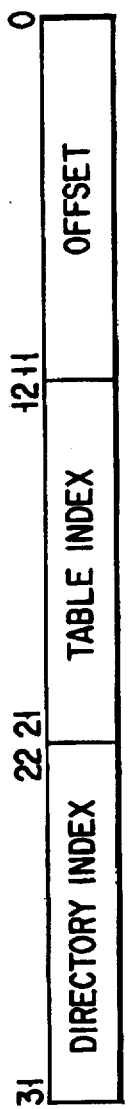
F I G. 12
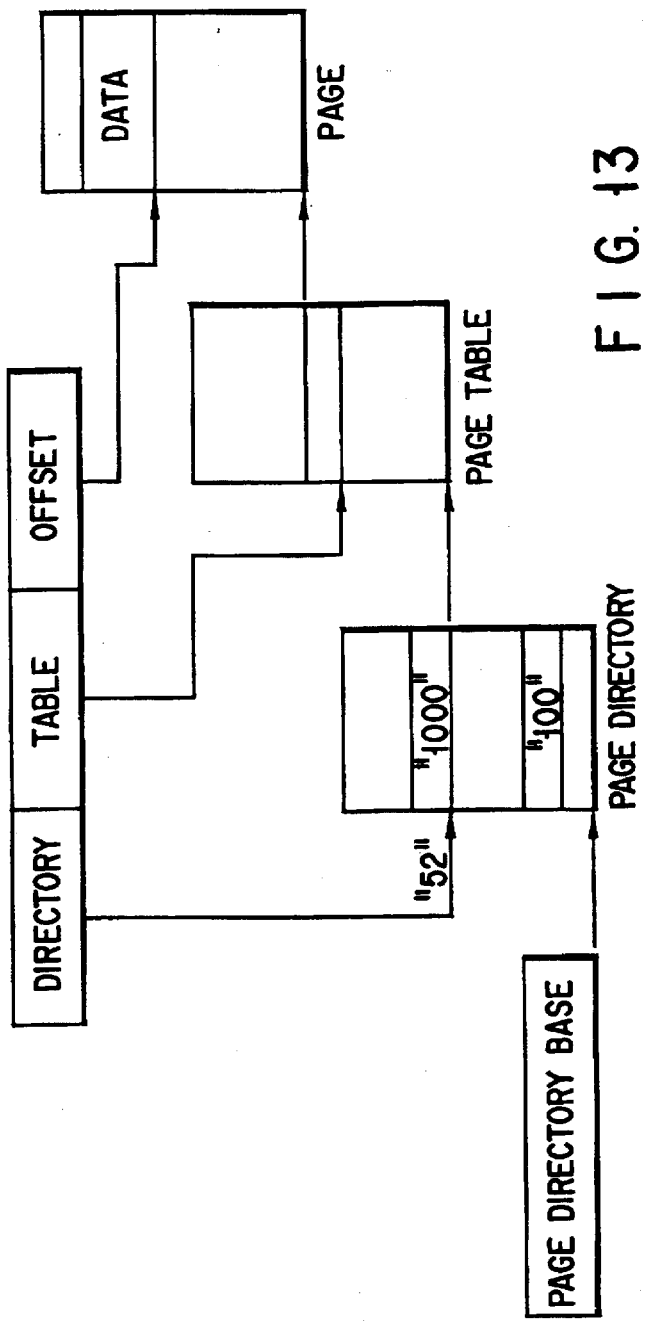
F I G. 13

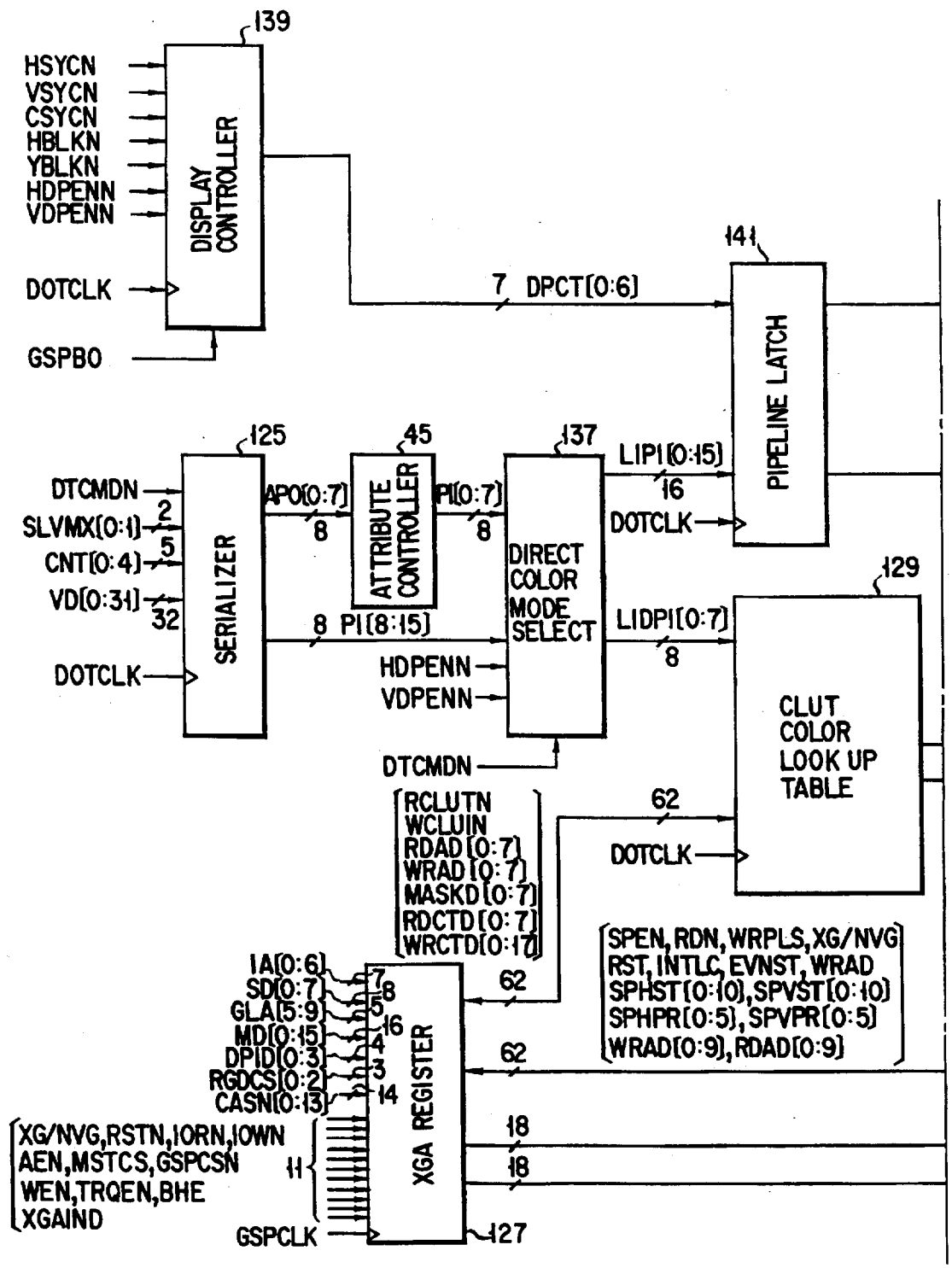
F I G. 15A

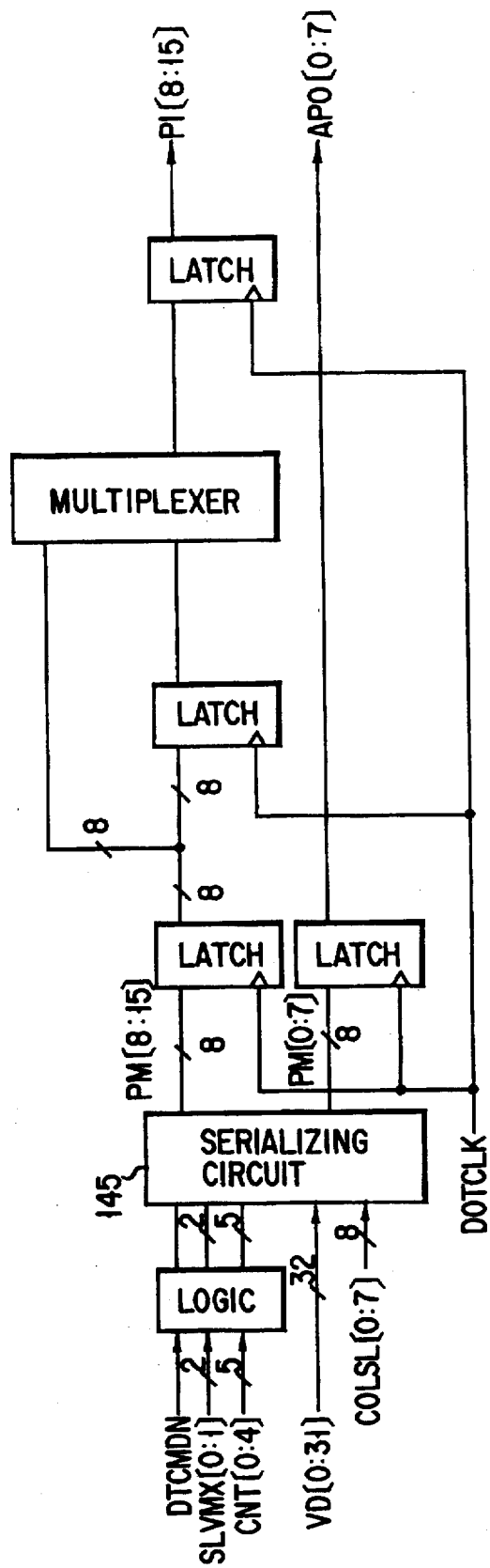
F I G. 16

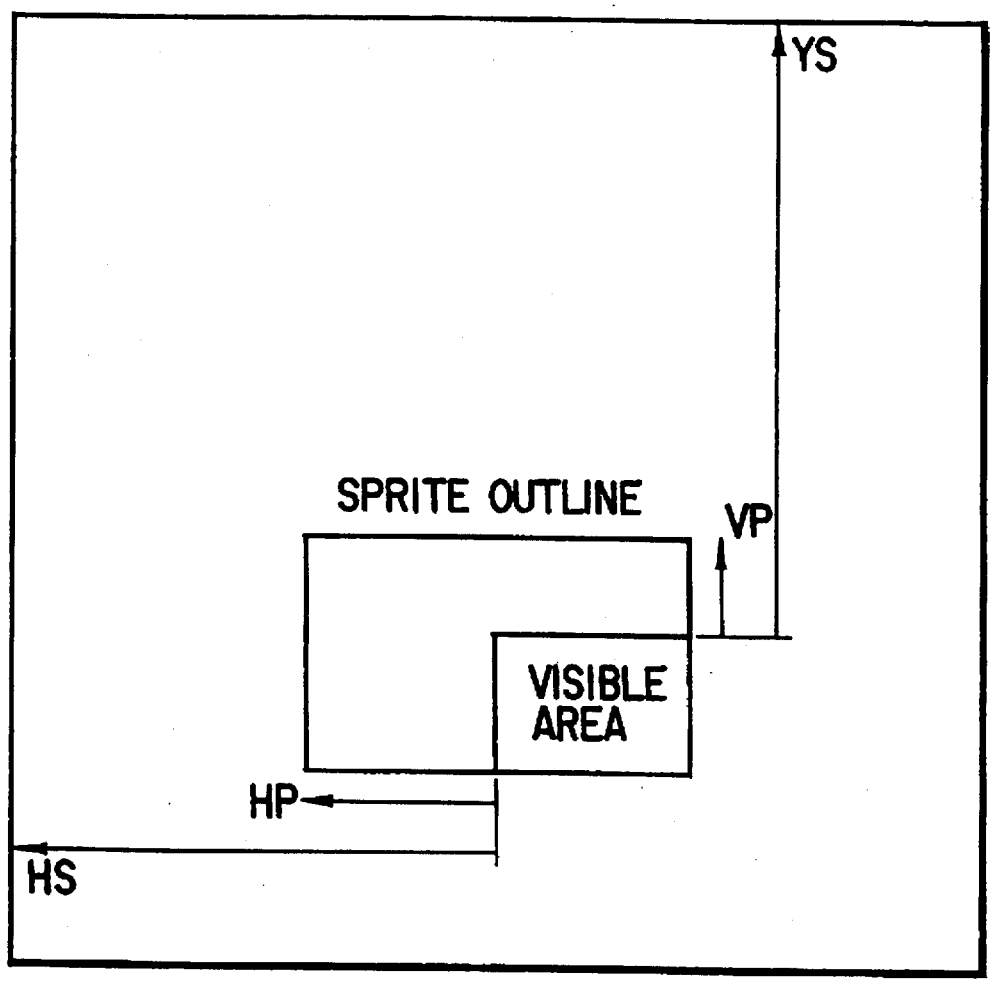
HS : HORIZONTAL SPRITE START
HP : HORIZONTAL SPRITE PRESET
VS : VERTICAL SPRITE START
VP : VERTICAL SPRITE PRESET
F I G. 18

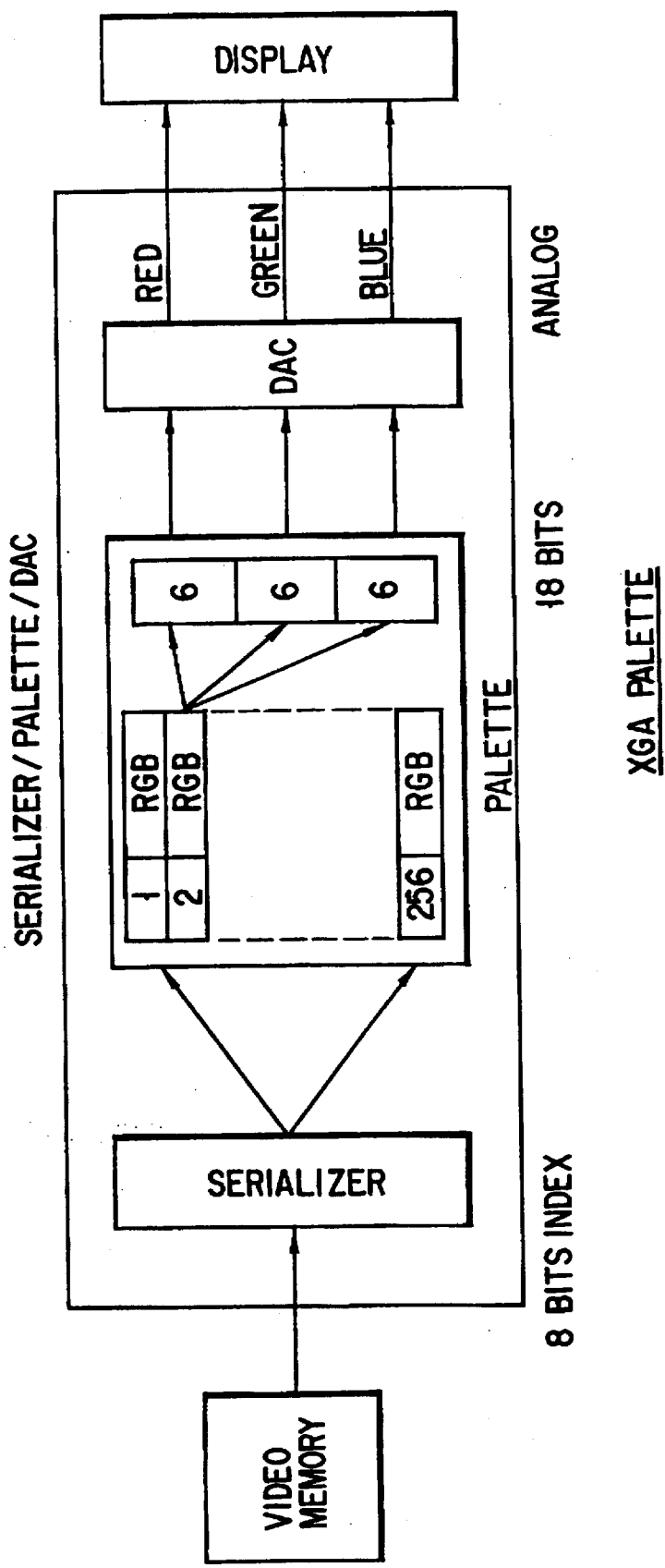
F I G. 19

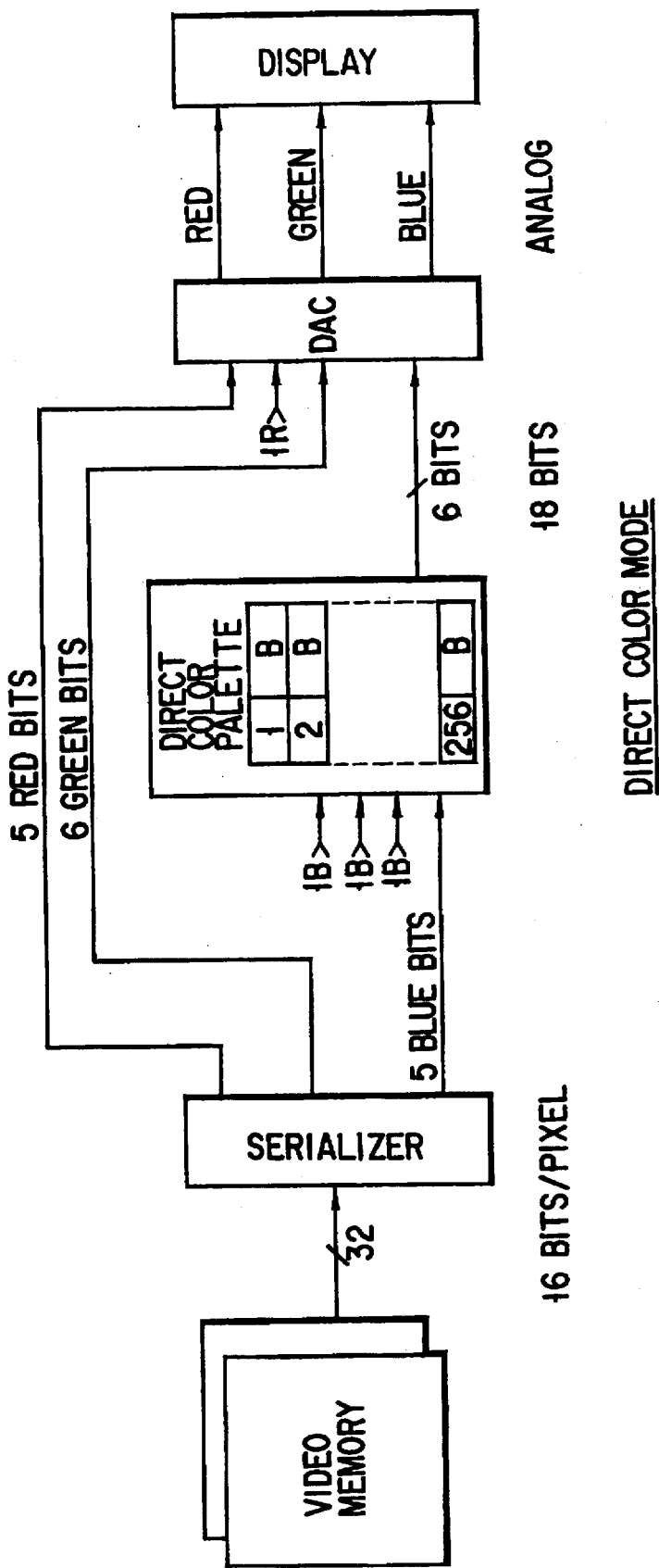
F I G. 20

INTERFACE HAVING A BUS MASTER ARBITRATOR FOR ARBITRATING OCCUPATION AND RELEASE OF A COMMON BUS BETWEEN A HOST PROCESSOR AND A GRAPHICS SYSTEM PROCESSOR

This application is division of application Ser. No. 08/150,779, filed Nov. 12, 1993, now U.S. Pat. No. 5,438,663.

BACKGROUND OF THE INVENTION

1. Field of the Invention

The present invention relates to an interface for a high performance graphics adapter, and more particularly, to an apparatus and method for interfacing a computer system to a high performance graphics adapter and for providing compatibility for the graphics adapter with other, more commonly available, graphics formats.

2. Description of the Related Art

In a conventional computer system, such as an "IBM compatible" microcomputer, graphics adapters are provided to serve as an interface between an application program operating on the computer system and a visual output medium, such as a cathode ray tube (CRT) or flat panel display. Examples of such graphics adapters currently in widespread use are those that utilize various types of graphic formats, such as EGA, VGA, MCGA, Hercules, 8514/A, etc. Many of these types of graphics adapters have become de facto industry standards.

For example, VGA graphics adapters are used extensively by microcomputers to provide reasonably high resolution multi-color graphics on a compatible CRT monitor. The VGA standard, as normally implemented, allows up to 16 different colors to be displayed simultaneously from a palette of over 256,000 different color combinations, and at a resolution of 640 pixels horizontally and 480 vertically. At lower resolutions, an even greater number of colors may be displayed simultaneously. In addition, some extensions to the VGA standard allow for a resolution beyond the standard 640 by 480 normal resolution.

In addition to the VGA, XGA (Trademark of International Business Machines Corporation) has been recently released. The XGA standard, as normally implemented, allows up to 256 different colors to be displayed simultaneously from a palette of over 256,000 different color combinations, and at a resolution of 1024 pixels horizontally and 768 vertically.

Because of the relatively high resolution and color flexibility found in the XGA standard, this and other similar standards, such as VGA, have become very popular among computer owners seeking high performance graphics at reasonable prices. However, as is common with other aspects of computer technology, significant improvements have been made in recent years with respect to graphics adapters. Notable among these improvement is the introduction of advanced, high-speed dedicated graphics system processors (GSPs), capable of providing advanced graphics capabilities at high speeds. These GSPs provide in a minimal number of integrated circuit packages many types of advanced graphics capabilities previously only achievable by utilizing multiple integrated circuit packages or emulating such functions in software. Moreover, these GSPs are able to provide such functionality at speeds greatly exceeding what was previously possible.

One such example of a GSP is a member of the TMS340x0 family of graphics system processors available from Texas Instruments of Dallas, Tex. (collectively referred to as the "340x0"), and its regional offices. Specific examples of this processor family include the 34010 first generation processor and the 34020 second generation processor. The 340x0 family is an advanced, 32-bit internal data path microprocessor, optimized for graphics display systems, and capable of being used with the Texas Instruments Graphics Architecture (TIGA), a software interface that standardizes communication between application software and all TMS340x0-based hardware for "IBM-compatible" personal computers. The capabilities of the 340x0 represent a major improvement in speed and power over previously existing graphics processors, including VGA and XGA graphics processors.

While the use of the 340x0 GSP may provide many advantages over graphics adapters such as those utilizing the VGA and XGA standards, the 340x0 is unfortunately incompatible with the previous graphics standards (such as VGA and XGA) from an addressing and data format point of view. Specifically, VGA and XGA use a special addressing scheme developed by IBM, while the 340x0 uses a conventional linear addressing scheme. Thus, the 340x0 GSP is unable to effectively operate upon graphics data generated by an application computer program operating on an associated host microprocessor when the graphics data is designed for use with VGA and XGA graphics adapters.

To circumvent this limitation, several display adapters have been developed recently which allow for the alternative use of the advanced capabilities of GSPs, such as the 340x0 processor, while including, additional redundant circuitry to support more standard graphics standards such as VGA and XGA. For example, some of these adapters are based on the 340x0 processor as well as an on-board VGA chip set. The user may manually select whether the 340x0 GSP will be utilized (via TIGA) or whether the XGA circuitry will be utilized through the use of a software setup utility.

In another arrangement, display adapters have previously been developed utilizing both 340x0 circuitry as well as XGA circuitry which may automatically utilize the appropriate circuitry depending upon what type of data is received. In this case, if TIGA data is received by the adapter, the 340x0 circuitry is used. On the other hand, if VGA data is received, this data is "passed through" to the VGA circuitry.

In both cases described above, because the 340x0 circuitry and the VGA circuitry operate wholly independently from one another, redundant circuitry is needed when both the 340x0 GSP and VGA circuitry are designed to be implemented within the same display adapter. Similar functions common to both types of formats are repeated for both the 340x0 and VGA. For example, a CRT controller, a sequencer, etc. are needed in both environments, and these components must therefore be duplicated in different forms for each of the 340x0 and VGA systems. This contributes to higher costs for manufacturing such adapters.

Therefore, it would clearly be advantageous to eliminate the inherent redundancy in having a complete 340x0 system as well as a complete VGA system located within the same display adapter. As described below, the present invention effectively addresses this problem.

A lot of functions of the 340x0 system are in common to the XGA system and yet are not compatible with the XGA system. Accordingly, it would be advantageous to make the 340x0 system compatible with the XGA system.

SUMMARY OF THE INVENTION

It is therefore an object of the present invention to provide an interface for a graphics system processor which allows the graphics system processor to display graphics data created for another graphics environment.

It is a further object of the present invention to provide an interface for a TIGA-compatible graphics system processor which allows the graphics system processor to display graphics data both in VGA and XGA formats.

It is another object of the present invention to provide an interface for a microprocessor, such as a graphics system processor, which allows the microprocessor to address data, such as graphics data, stored in an addressable format incompatible with the microprocessor.

It is yet another object of the present invention to provide an interface for a TIGA-compatible graphics system processor which allows the microprocessor to address graphics data stored in an IBM addressable graphics format.

It is yet another object of the present invention to provide an interface for a microprocessor, such as a graphics system processor, which allows the microprocessor to read data, such as graphics data, stored in a data format incompatible with the microprocessor.

It is yet another object of the present invention to provide an interface for a TIGA-compatible graphics system processor which allows the microprocessor to read graphics data stored in XGA data format.

In accordance with the present invention, an interface for high-performance graphics data is provided which allows for graphics compatibility with another type of graphics environment. In a preferred embodiment, the interface is used in a computer system which includes a host processor, a coprocessor in the form of a graphics system processor, and memory addressable by both host and coprocessors. An application computer program running on the host processor utilizes a graphics operating system, such as a video Graphics Array Basic Input/Output System (VGA BIOS) including an extended graphics array function to write graphics data in VGA format and in XGA format, respectively to the memory, or the software application may write directly to the video memory, bypassing the BIOS. A totally awesome controller translates memory addresses generated by the VGA BIOS including the XGA function or the direct access by the application (and hence the host processor) into memory addresses recognized by the coprocessor such as the 340x0 GSP. One or more graphics controllers store the graphics data, expanded into VGA or XGA format, into a VGA or XGA video random-access memory (RAM) buffer.

A more complete appreciation of the present invention and many of its attendant advantages will be readily obtained as the invention becomes better understood by reference to the following detailed description when considered in connection with the accompanying drawings.

BRIEF DESCRIPTION OF THE DRAWINGS

FIGS. 2A and 2B depict a block diagram showing an entire system and the various components of the present invention in a preferred embodiment;

FIG. 8 depicts a video memory format representing the first three bytes of the memory map in Intel Order;

FIG. 9 depicts a video memory format representing the first three bytes of the memory map in Motorola Order;

FIG. 12 depicts a format showing a linear address field from the Coprocessor in XGA system of IBM;

FIG. 13 depicts Linear to Physical Address Translation in XGA system of IBM;

FIGS. 15A and 15B depict a block diagram showing in detail the back-end gate array depicted in FIG. 14;

FIG. 16 is a block diagram showing the serializer and its peripherals depicted in FIG. 15;

FIG. 18 depicts Sprite Positioning; and

FIGS. 19 and 20 depict XGA palette and direct color mode, respectively.

BRIEF DESCRIPTION OF THE PREFERRED EMBODIMENTS

Figure 1:
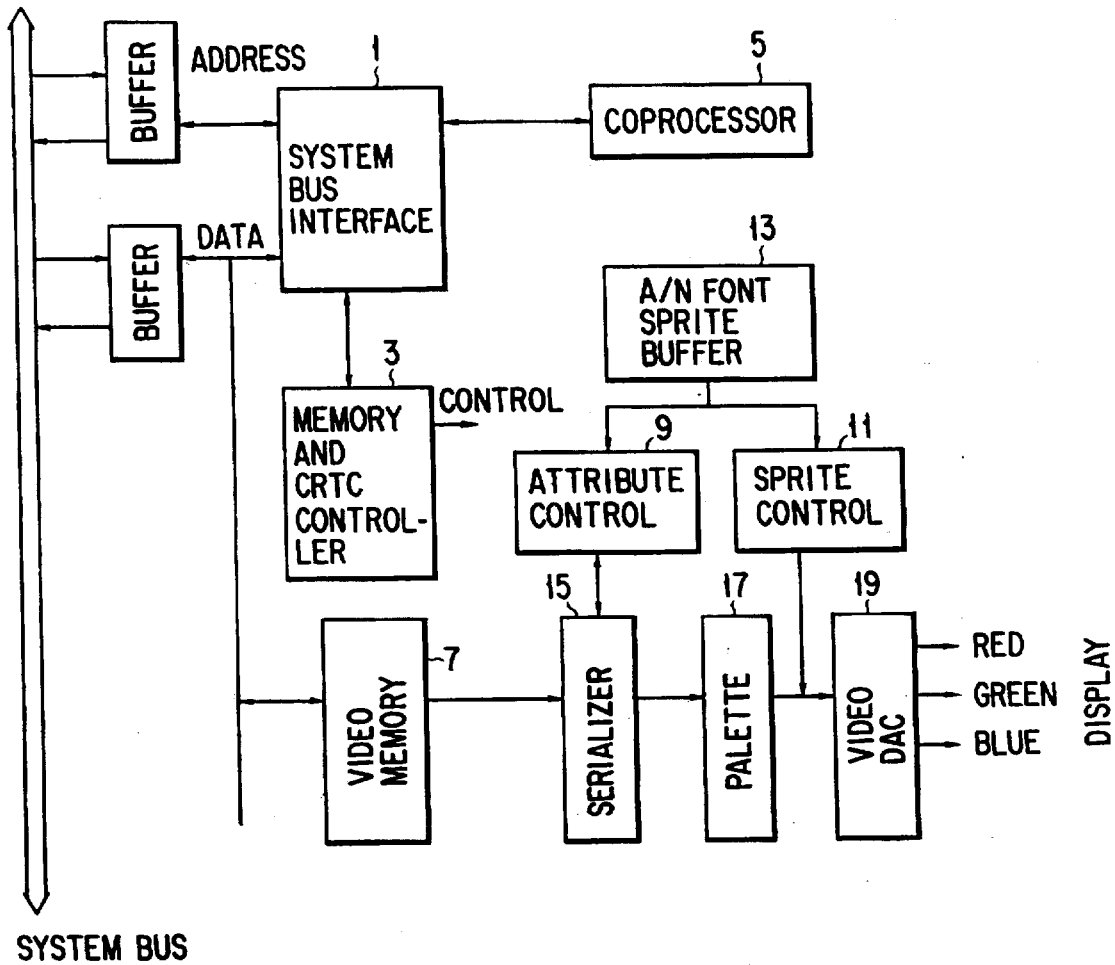
FIG. 1 illustrates a block diagram of an XGA graphics system known in the prior art.

In order to appreciate the detailed discussion that follows, the following terms will now be described.

ATTRIBUTE CONTROLLER: Under VGA, the attribute controller supports a 16-color palette, controls the attribute mode, controls horizontal pixel panning, as well as other related functions.

CATHODE RAY TUBE (CRT): Any one of many types of readily available output devices, capable of displaying graphical information from a video display system, which receives its data in a sequential manner. For purposes of the present invention, the CRT is capable of displaying graphical information generated by a 34020 GSP based video display system.

CATHODE RAY TUBE CONTROLLER (CRTC): The CRTC generates horizontal and vertical timing signals, as well as increments a video buffer address counter at a rate synchronized with the timing signals. In conjunction with the CRTC, the video display circuitry reads data from the VIDEO BUFFER using the CRTC's address value, decodes the data, and sends the resulting color and brightness signals to the monitor along with the CRTC's timing signals. In addition, the CRTC determines the position of a cursor on the CRT.

CENTRAL PROCESSING UNIT (CPU): The CPU is a microprocessor which forms the central control circuitry in the computer system. For purposes of the present invention, the CPU acts as the host processor upon which an application may run which generates graphical output in VGA format, XGA format, or in TIGA format.

DIGITAL-TO-ANALOG CONVERTER (DAC): Under VGA or XGA, the video DAC generates the analog signals from digital counterparts to display the various colors on the CRT.

GRAPHICS CONTROLLER: Under VGA or XGA, the graphics controller mediates data flow between the VGA or XGA VIDEO RAM BUFFER and the CPU during video memory read or write.

GRAPHICS SYSTEM PROCESSOR (GSP): A microprocessor optimized for graphics display systems. For purposes of a preferred embodiment of the present invention, a GSP may be a TMS 34020 GSP coprocessor, which is an advanced 32-bit microprocessor and is the second generation of the TMS340x0 family of GSPs available from Texas Instruments. However, it shall be understood that any member of the TMS340x0 family of GSPs, or any other type of GSP may just as easily be utilized for purposes of the present invention. For background information purposes, a detailed discussion of the TMS34020 GSP is present in the book "TMS34020 User's Guide", available from Texas Instruments of Dallas, Tex., and/or through its regional offices.

HARDWARE REGISTERS: External I/O means for communicating with external hardware. In order to utilize hardware registers, a program operating on a host CPU may read and/or write to an I/O address, connected to which is external register hardware which couples the signals to the appropriate device(s).

SEQUENCER: Under VGA or XGA, the sequencer generates internal timings for video RAM addressing so as to arbitrate the usage of the bus between the host CPU and the CRTC.

TEXAS INSTRUMENT GRAPHICS ARCHITECTURE (TIGA): TIGA is a software interface that standardizes communication between application software and all TMS340x0 GSP family-based hardware for IBM-compatible microcomputers. The TIGA interface is increasingly becoming a standard for high performance graphics applications, and is commonly known to those of ordinary skill in the art. For background information purposes, a detailed discussion of the TIGA interface format is present in the book "TIGA Interface User's Guide", available from Texas Instruments of Dallas, and/or through its regional offices.

VIDEO RAM BUFFER: The video RAM buffer is a block of random access memory (RAM) addressable by both the host CPU and the video system. The video system's display circuitry updates the CRT's screen by continually and repeatedly reading the data stored in the video RAM buffer. At the same time, an application program executing on the host CPU may change the contents of the video RAM buffer.

EXTENDED VIDEO GRAPHICS ARRAY (XGA): XGA is an extended graphics subsystem available for "IBM-compatible" microcomputers which allows for high resolution graphics modes (at least 1024 by 768 pixels) supporting multiple colors (at least 256 simultaneous colors from a palette of over 256,000 colors and over 64,000 colors in 640×480×16 BITS mode). The XGA format for outputting graphics data has become somewhat of a de facto standard in recent years, and is commonly known to those of ordinary skill in the art.

System Address bus (SA[19:0]). The system address bus is used to address memory and I/O devices on the ISA-bus. When either the 386SL CPU or 82360SL drives this bus, it latches the SA[19:0] address signals and holds them valid throughout the bus cycle.

Local Address bus (LA[23:17]). These signals are used to address memory devices on the ISA-bus. Together with the system address signal, they allow the 386 SL CPU or 82386 SL to address up to 16 Mbytes on the ISA-bus. The 386 SL CPU and 82360 SL do not latch the local address bus signals.

System Data Bus (SD[15:0]). This 16-bit data bus is used to transfer data between the 386SL CPU, the 82360SL, system memory and I/O devices.

GSP data bus (MD[0:31]). This 32-bit data bus is used to transfer data between the GSP, 386SL CPU, the 82360SL, system memory and I/O devices.

I/O Read (IOR). This active low signal instructs an I/O device to drive data onto the data bus.

I/O Write (IOW). This active low signal instructs an I/O device to internally latch the data on the data bus.

Memory Read (MEMR). This active low signal notifies a memory device to drive its data onto the data bus.

Memory Write (MEMW). This active low signal notifies a memory device to internally latch data from the data bus.

Address Enable (AEN). The 82360SL drives this signal high during DMA cycles to indicate that its internal DMA controller currently controls the system address bus, local address bus, and ISA-bus command signals (MEMR, MEMW, I/OR, and I/OW).

DMA Request (DRQ[7:5, 3:0]). These active high 82360 SL input signals are used to request DMA data transfer.

DMA Acknowledge (DACK[7:5,3:0]). These active low 82360 SL outputs indicate that control of the ISA-bus has been granted to a DMA channel. When it is ready to begin DMA transfers, the 82360SL asserts (low) the DACKn signal corresponding to an active DRQn signal.

Master (MASTER). This 386SL CPU and 82360 SL input is asserted (low) by an external bus master to gain control of the ISA-bus. Before MASTER can be asserted, the external bus master must issue a DRQn to a DMA channel and receive a DACKn from the 82360SL.

Buffered Address Latch Enable (BALE). The SA[19:0] address lines are internally latched by the 386SL CPU and 82360SL on the falling edge of this active high signal. This signal can be used by external devices to latch the LA[23:17] address lines. It is forced high by the 386 SL CPU during DMA cycles.

Referring to FIG. 1, a block diagram is shown of the XGA subsystem, as is commonly known in the prior art. Referring to this diagram, the following elements are shown: System Bus Interface 1, Memory and CRT Controller 3, Coprocessor 5, Video Memory 7, Attribute Controller 9, Sprite Controller 11, A/N Font and Sprite Buffer 13, Serializer 15, Palette 17, and Video DAC 19. The basic interaction of these components will now be described in some detail.

The System Bus Interface 1 provides control of the interface between the video subsystem and the system microprocessor. It decodes the addresses for VGA and Extended Graphics I/O registers and the memory addresses for the coprocessor memory mapped-registers and video memory. It also provides the bus-master function and determines whether the system data bus is 16- or 32-bits wide.

Memory and CRT Controller 3 controls accesses to video memory by the system microprocessor, displays the contents of video memory on the display, and provides support for the VGA and 132-column text modes.

Coprocessor 5 provides hardware drawing-assist functions. These functions can be performed on graphics data in both video memory and system memory. The coprocessor updates memory independent of the system microprocessor. The instructions are written to a set of memory-mapped registers; the coprocessor executes the drawing function. The coprocessor functions are: Pixel-Block or Bit-Block Transfers This function transfers an entire bit map, or part of a bit map, from one location to another. This transfer can be:

Within video memory

Within system memory
Between system and video memory
Line Drawing

This function draws lines, with a programmable style and thickness, into a bit map in video memory or system memory.

Area Fill

This function fills an outlined area with a programmable pattern. This function can be performed on an area outline in video or system memory.

Logical and Arithmetic Mixing

These functions provide logical and arithmetic operators that can be used against data in video and system memory.

Map Masking

This function provides control over updates to each Pixel for all drawing functions.

Scissoring

This function provides a rectangular-mask function, which can be used instead of the mask map.

X, Y Axis Addressing

This function allows a Pixel to be specified by its X and Y coordinates within a pixel map, instead of its linear address in memory.

Video Memory 7 stores on-screen data. Because this memory is dual port, video memory can be read serially to display its contents at the same time the data is being updated.

Attribute Controller 9 works together with the memory and CRT controller to control the color selection and character generation in the 132-column text mode and VGA text mode.

Sprite Controller 11 is used to display and control the position and image of the sprite, which is used as the cursor. The sprite is not available in 132-column text mode or VGA mode.

The Serializer 15 takes data from the serial port of video memory in 16- or 32-bit widths (depending on the amount of video memory installed) and converts it to a serial stream of Pixel data. The Pixel data is used to address a palette 17 location, which contains the color value. The color value is then passed to the DAC 19, which converts the digital information into analog red, green, and blue signals to the display.

A/N Font and Sprite Buffer 13 holds the character fonts in 132-column text mode and VGA modes. It also stores the sprite image while in Extended Graphics Array (XGA) modes.

Figure 2A:
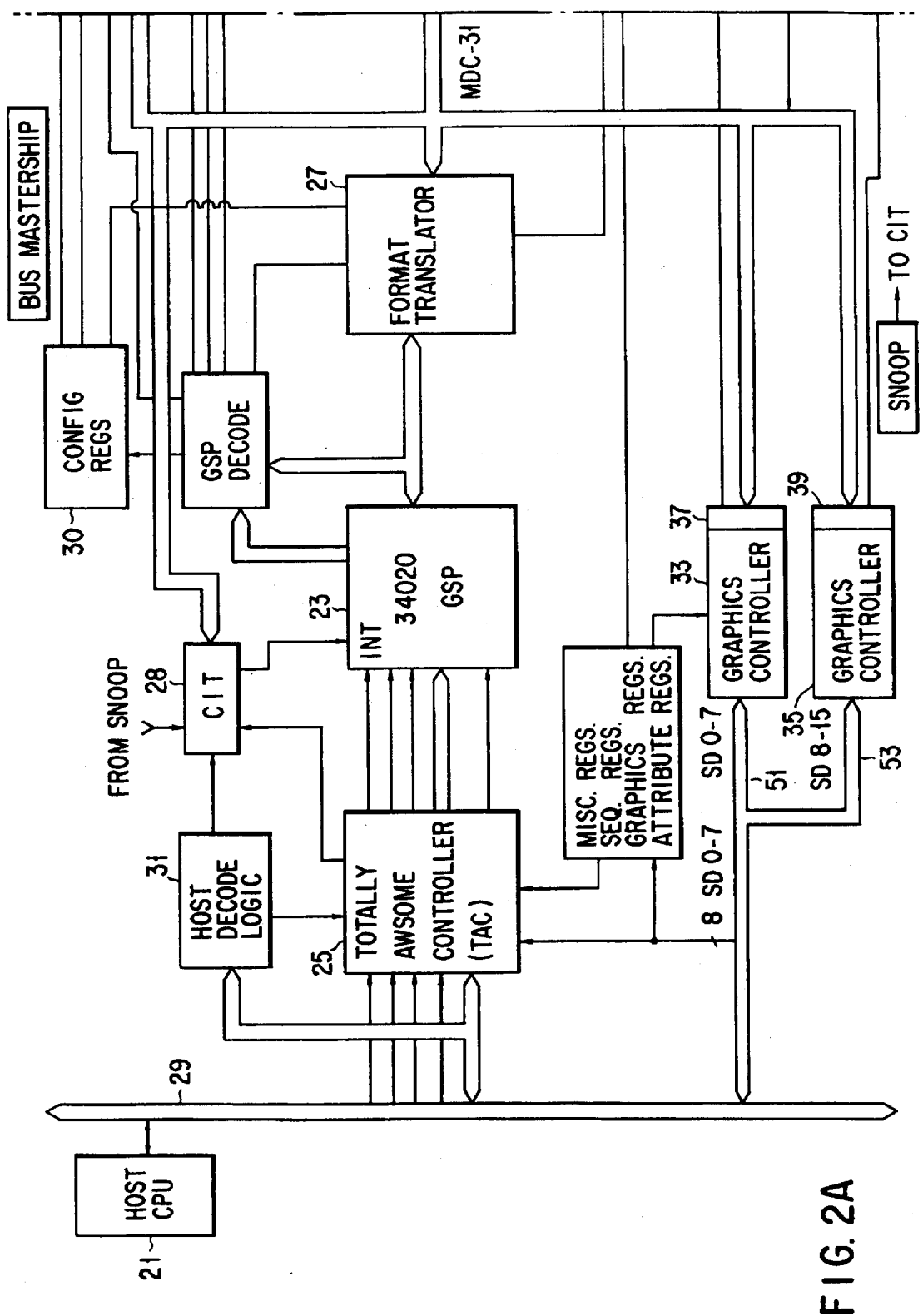

Referring to FIGS. 2A and 2B, a block diagram is shown depicting the present invention in a preferred embodiment. Specifically, FIGS. 2A and 2B illustrate the present invention constituting an interface between an application computer program running on a host CPU 21 and the 34020 graphics system processor (GSP) 23. In order to understand the functionality of the present invention, the various parts of FIGS. 2A and 2B will now be explained.

First, it is important to note that the 34020 GSP 23 could software emulate the VGA and XGA systems without the use of Totally Awesome Controller 25, Format Translator 27, and related components, but the performance would be extremely poor. Thus, hardware circuitry is provided according to a preferred embodiment of the present invention to improve performance.

Bus 29 is located within the microcomputer with which the present invention is designed to operate. In a preferred embodiment, this bus comprises an Industry Standard Architecture (ISA) bus, as commonly utilized in microcomputer architectures. However, as will be understood by one of ordinary skill in the art, any other type of bus may just as easily be used, such one conforming to an Extended Industry Standard Architecture (EISA), Microchannel Architecture (MCA), etc.

Coupled to bus 29 is a host CPU 21, which in a preferred embodiment comprises a microprocessor from the Intel 80×86-compatible family. This CPU forms the center of the host microcomputer, and is connected to bus 29 so as to be able to address, read from, write to, etc. memory and other devices coupled to bus 29. Of course, the microprocessor could consist of one or more of a multitude of commonly available microprocessors available on the market, and it will be seen by one of ordinary skill that the specific type of microprocessor used is irrelevant to the implementation of the present invention.

Host Decode logic 31 and Totally Awesome Controller (TAC) 25 form the components of the present invention which perform the memory address conversions necessary for Host CPU 21 to access VGA and XGA graphics data written by the host CPU's application program. TAC 25 performs the actual memory address conversions while Decode Logic 31 effectively instructs TAC 25 whether such memory conversions are necessary. Host Decode Logic 31 and TAC 25 will be discussed in further detail below under the appropriate heading.

Graphics System Processor (34020 or GSP) 23 forms the central processing component for the graphics display system of the present invention. As previously discussed, GSP 23 consists of a 34020 GSP available from Texas Instruments.

Graphics Controllers 33 and 35, and their respective access to Hidden Registers 37 and 39, are responsible for managing the transfer of graphics data between the CPU and the VGA frame buffer, which is stored in video Random Access Memory (VRAM) 41 (described in further detail below). Graphics controllers 37 and 39 perform similar functions to the graphics controller within an XGA chip (discussed previously), but implemented in a slightly different format, as will be discussed below.

Dynamic Random Access Memory (DRAM) 43 stores VGA and XGA register files, programs for controlling the 34020 GSP 23, and the like and is accessed by the GSP 23. Conversely, Video Random Access Memory (VRAM) 41 represents video-type RAM (having a serial output port) in which graphics data in 34020 GSP format is placed. This data may be generated directly by GSP 23 under the control of the host CPU (when TIGA is used). This interaction of these components will be explained in further detail under the appropriate heading.

Attribute Controller 45 and DAC 49 perform similar functions as their counterparts in the VGA chip. Finally, the Back-End Gate Array 47 includes serializer 125 and Color Lookup Table 129 which perform similar functions as their counterparts in the XGA chip. Furthermore, the Back-End Gate Array includes Display Controller 139, VGA Registers, and XGA Registers 127. These components produce output on Cathode Ray Tube (CRT)50, which is a video monitor compatible with the high performance 34020 GSP 23. These components will also be discussed in further detail later.

A configuration register 30 comprises a plurality of registers which store data indicating "Packed Pixel" format or "Bit-Plane" format in VGA mode to be supplied to the Format Translator 27, pixel size (1 bit-pixel, 2 bits-pixel, 4 bits-pixel, 8 bits-pixel and 16 bits-pixel sizes) in the XGA mode. The configuration register 30 includes the following registers:

GSP Pixel Width and X-Zoom Mode Control (Old 8 bit/4 bit Sel):

| GSP Read/Write Address = B800 0110h | |
|---|---|
| Register Size - 8Bits | |
| Bit 0 | Sel Video Mux 0 |
| Bit 1 | Sel Video Mux 1 |
| Bit 2 | Direct Color 16 |
| Bit 3 | Reserved |
| Bit 4 | X-Zoom 0 |
| Bit 5 | X-Zoom 1 |

| Direct Color 16 | Sel Video Mux1 | Sel Video Mux0 | Bits/Pixel |
|---|---|---|---|
| 0 | 0 | 0 | 1 |
| 0 | 0 | 1 | 2 |
| 0 | 1 | 0 | 4 |
| 0 | 1 | 1 | 8 |
| 1 | X | X | 16 |

| X-Zoom 1 | X-Zoom 0 | Horizontal Zoom |
|---|---|---|
| 0 | 0 | X1 |
| 0 | 1 | X2 |
| 1 | 0 | X4 |
| 1 | 1 | X4 |

GSP Unpack Pack Pixel Register (PPackReg)
GSP Read/Write Address=B800 0188h
Register Size=8 bits
Bits 0,1 These bits determine the type of data translation to be performed on the GSP Data bus. The swizzling functions occur only to/from VRAM Bank 1 (Start Address C800 000h) for a span of 256K bytes.

| Bit 0 | Bit 1 | Description |
|---|---|---|
| 0 | 0 | Data is passed unaltered |
| 0 | 1 | Data is passed unaltered |
| 1 | 0 | Data is swizzled from a planar format to a packed pixel format on reads and vice versa on writes |
| 1 | 1 | Data is swizzled from a mode 4 & 5 format to a packed pixel format on reads and vice versa on writes |

Bit 2 Data-Lock
 1=Data only on MD Bus. No mask is allowed during any Pixel Operations
 0=Mask register is applied to MD Bus during RAS cycle of Pixel operations
Bit 3 Flash Write
 1=Flash Writes during selected Pixel Operations
 0=Flash Writes disabled
Note:
Definition of 34020 A Transfer and Write cycles with Mask (Bit 2=0) and Flash (Bit 3=1).
 The specific details on Mask and Flash cycles are described in the TC528128A VRAM data sheets in the Toshiba MOS memory data book. The specific details on the following memory cycles are described in the TMS34020 Users Manual. As noted below, some of the TMS34020 cycles have been modified.
 On a VRAM write transfer, the first write transfer following any read transfer is always a pseudo-write transfer. All following write transfers will be normal write transfers with a write mask if the write Mask bit is set, else, it becomes a normal write transfer with no mask. VRAM Alternate-Write (CPU-generated) transfers become Flash Write Transfers with Mask if the Flash Write bit is set. If the Flash Write bit is not set then the cycle will be a 34020 VRAM Alternate-Write. One extremely useful way of using the CPU-generated write transfer functions is when trying to initialize several rows of VRAM to a particular value. If several rows require the same pattern, then all one has to is to write the pattern to a single row, do a read transfer, then a write transfer to the rows which require the same pattern. Therefore, a 1024×768 screen can be initialized to a particular row value in less than 60 μs. Flash write initializes an entire row to the value of the internal VRAM Color Register. Therefore, on a single 34020 cycle, an entire row can be initialized.
 VRAM Write-Mask cycles perform normally, but only the PMASK instruction can be used. The PMSKL and PMSKH instructions are unusable. This is because the external PMASK register is a 32 bit only register. There are no restrictions on the VLCOL instruction which loads the VRAM color register.
 If Bit 2=1, then all pixel-write instructions (no matter how the TMS34020 is programmed) become write cycle with no mask. If this bit is set to 0 then, if the TMS34020 is programmed to do a write cycle with mask, a pixel cycle with mask is performed. This restriction also applies to Block-Write instructions.
GSP Bill Register
 GSP Read/Write Address=B8000 01C0h Register size=8 bits
 Bit 0 Enable VGA Palette RAM
 0=Disable
 1=Enable
 Bit 1 Enable VGA Panning
 0=Disable
 1=Enable
 Bit 2 Enable VGA Border
 0=Disable
 1=Enable
 Bit 3 Horizontal Sync Delay Select 0. Please see table below
 Bit 4 Horizontal Sync Delay Select 1. Please see table below
 Bit 5 Attribute Controller Clock Enable.
 0=Disable
 1=Enable

| Horizontal Sync Pulse Delay Table (Units of Dot Clocks) | | |
|---|---|---|
| Bit 1 | Bit 0 | DotClk Delay |
| 0 | 0 | 0 |
| 0 | 1 | 2 |
| 1 | 0 | 4 |
| 1 | 1 | 6 |

Note:
The Dot Clock that drives all the Attribute circuitry can be disabled when it is not needed. For instance, when one is in TIGA mode, it would be wise to conserve power and reduce clock noise by the Attribute Controller dot clock.
Overall Operation of the Present Invention
 Referring back to FIGS. 2A and 2B, the overall operation of the present invention in a preferred embodiment will now be discussed. For purposes of describing the operation of the present invention, it will be assumed that a computer program application is operating on the host CPU 21 which is coupled to the main system bus 29. Examples of such a program may include popular software packages readily available in the marketplace, such as spreadsheets, word processors, graphing packages, etc. One of ordinary skill in the art will recognize that the type of application running on the host CPU is irrelevant for purposes of the present invention—only the application's output graphics operations are relevant when discussing the operation of the present invention.

In a preferred embodiment, the application program, running on the host CPU generates graphical output in either (1) Video Graphics Array (VGA), (2) Extended Graphics Array (XGA) or (3) Texas Instruments Graphics Architecture (TIGA) format. In the cases of (1) and (2), the application program is able to utilize the various graphics functions available through interrupt calls (via interrupt 10 hex, etc.) to the XGA Basic Input/Output System (BIOS), which is in common use in virtually all microcomputers having the capability of displaying graphics in the XGA format, or the application may directly access the XGA I/O registers or XGA memory. In the case of (3), the application may utilize the normal VGA BIOS, the normal XGA BIOS, a special TIGA BIOS, or may also use a special BIOS which allows for graphics processing to be performed on both the host CPU and the GSP. These scenarios will be discussed further below.

Host CPU 21, under the control of the XGA BIOS, stores the graphics data through data lines 51 and 53 into VRAM area 41a.

In XGA mode, the Host CPU can access the VRAM 41 up to 1M bytes (areas 41a and 41b). The area 41c is used for the XGA emulation by the GSP. The VRAM 41 is expandable up to 1M bytes in XGA mode and 112.5M bytes in GSP mode, for example.

In order to operate upon the XGA graphics data stored in VRAM area 41a, GSP 23 must necessarily utilize, in a preferred embodiment, native machine-language instructions. Such instructions are, in a preferred embodiment, stored in VRAM area 41b or DRAM area 43 along with the XGA graphics data.

Additionally, because of a unique addressing scheme utilized by the VGA format, special circuitry is utilized in a preferred embodiment to translate memory addresses generated by Host CPU 21 into addresses applicable to the format under which VGA graphics data is stored. Specifically, under different modes of the VGA format, the normal address lines used in storing graphics data are transposed (convoluted). On the other hand, the 34020 GSP utilized in a preferred embodiment utilizes a linear address scheme. Accordingly, Totally Awesome Controller 25 and accompanying Decode Logic 31 are used in a preferred embodiment to properly control addresses generated by Host CPU 21. This circuitry will be discussed in detail below, as well.

The Totally Awesome Controller

Figure 3:
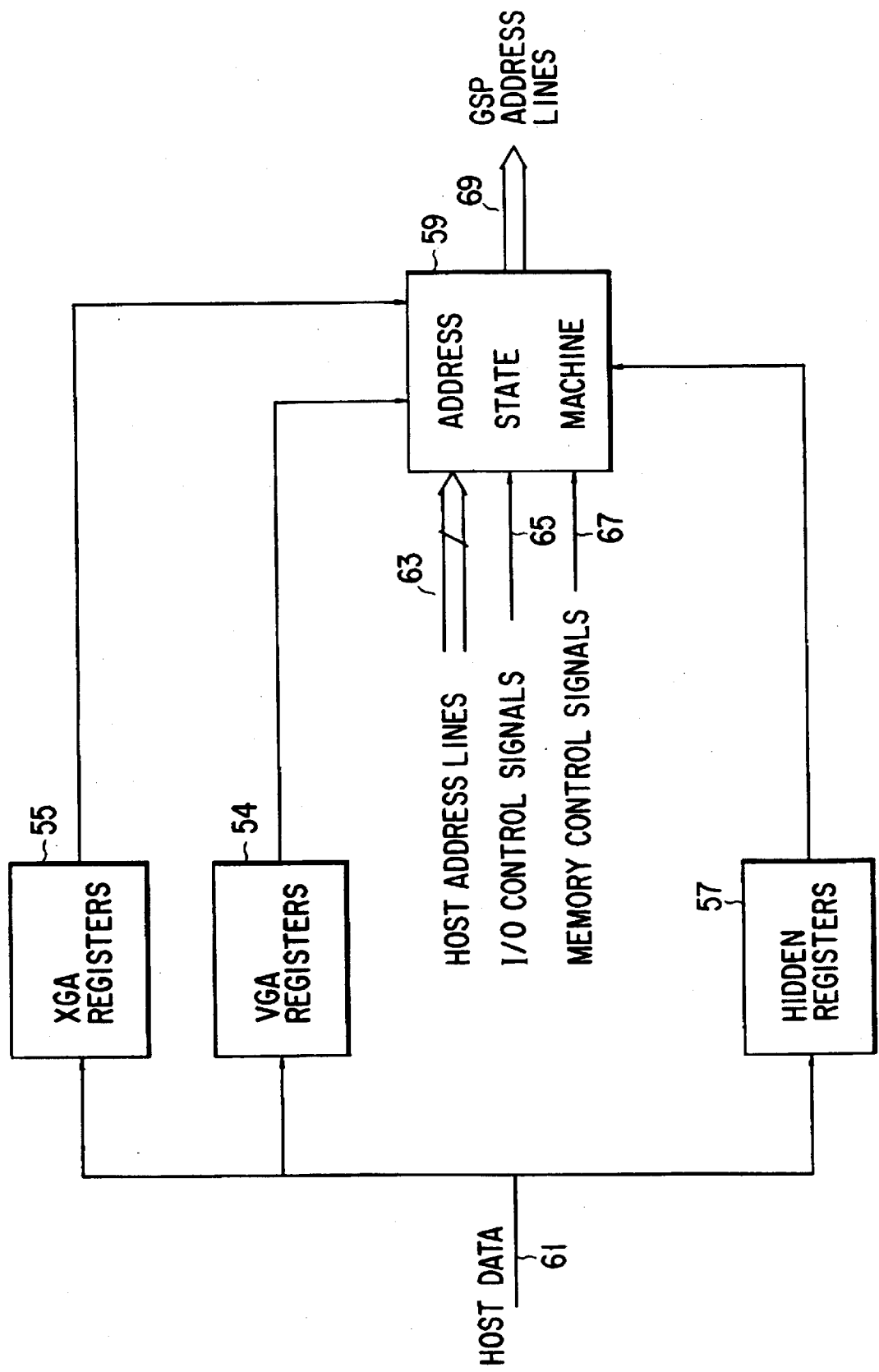
FIG. 3 is a block diagram showing in detail the totally awesome controller depicted in FIGS. 2A and 2B.

Referring to FIG. 3, the Totally Awesome Controller (TAC) (element 25 in FIG. 2A) and accompanying Decode Logic (element 31 in FIG. 2A) are depicted, combined into Address State Machine 59, VGA registers 54, XGA Registers 55 and Hidden Registers 57. First, VGA Registers 54 and XGA registers 55 correspond to standard VGA and XGA registers in the video system. With VGA and XGA, these registers may be utilized by the application program and VGA and XGA BIOS to perform various functions within the video system, such as to control the attribute controller, the CRT controller, the sequencer, the graphics controller, and the Back-End Gate Array. Therefore in order to maintain compatibility with VGA and XGA, these registers must be present. The details of the VGA mode are described in U.S. Ser. No. 07/785,935 filed by the same inventor of the present application.

More specifically, the XGA subsystem has a Coprocessor State Save/Restore function. When operating in a multitasking environment, it is necessary to save and restore the state of the display hardware when switching tasks. It is possible that a task switch is required when the Coprocessor is in the course of executing an operation. Thus not only the contents of registers visible to the host system but also contents of internal registers (the "state" of the Coprocessor) must be saved/restored. The Coprocessor has special hardware that allows it to suspend the execution of an operation and efficiently save and restore task states.

The XGA Coprocessor provides two special 32-bit Save/Restore Data Ports through which all the coprocessor state data passes when the state is being saved or restored. The number of double-words that should be read or written is determined by two read only registers: the State Length registers, A and B. The amount of data to be saved/restored is less than 1 KB. State saving software performs string I/O read instructions, reading data from the two Save/Restore Data Ports in turn into memory. The XGA coprocessor hardware automatically provides successive double-words of data on successive reads. After the state has been saved, the Coprocessor is in a reset state.

Restoring the state of the Coprocessor is performed using a similar process. State data is moved back into the Coprocessor using string I/O write instructions. The state data is written back into the Coprocessor in the same order to that in which it was read (that is first out should be first in).

Figure 5:
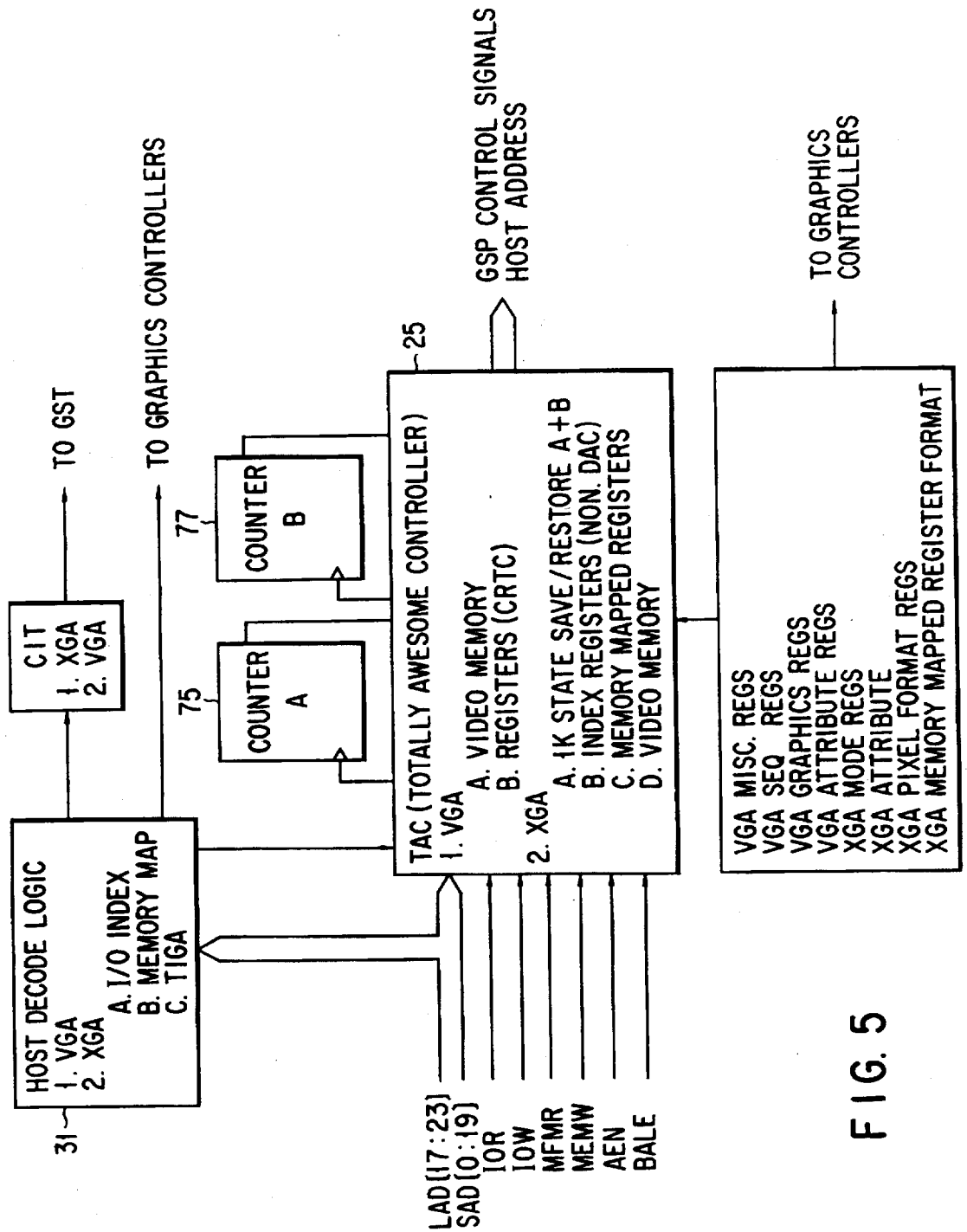
FIG. 5 is a block diagram showing in detail the totally awesome controller and its peripherals depicted in FIGS. 2A and 2B.

In order to emulate the Coprocessor State Save/Restore, according to the present invention, counters 75 and 77 are provided in XGA registers 55. In FIG. 5, these counters are shown out of the XGA registers 55 for the convenience of explanation. These counters serve as address pointers of two 1 K-byte buffers, respectively. These buffers are assigned in the DRAM 43 to thereby software emulate the Save/Restore function. Host Decode Logic 31 decodes commands of I/O access A and I/O access B supplied from the system bus 29 and informs TAC 25 of the decoded results. In response to the decoded results and upon receiving the I/O read signal (IOR) or I/O write signal (IOW), the TAC 25 increments the counters 75 and 77.

Further, Index registers in XGA mode are software emulated. TAC 25 converts these index register addresses into DRAM addresses where the index registers are assigned and accessed by the GSP. These index registers are:

| Index | Register |
|-------|----------|
| 0C | Coprocessor Save/Restore Data A |
| 0D | Coprocessor Save/Restore Data B |
| 10 | Horizontal Total Lo |
| 11 | Horizontal Total Hi |
| 12 | Horizontal Display End Lo |
| 13 | Horizontal Display End Hi |
| 14 | Horizontal Blanking Start Lo |
| 15 | Horizontal Blanking Start Hi |
| 16 | Horizontal Blanking End Lo |
| 17 | Horizontal Blanking End Hi |
| 18 | Horizontal Sync Pulse Start Lo |
| 19 | Horizontal Sync Pulse Start Hi |
| 1A | Horizontal Sync Pulse End Lo |
| 1B | Horizontal Sync Pulse End Hi |
| 1C | Horizontal Sync Position |
| 1E | Horizontal Sync Position |
| 20 | Vertical Total Lo |
| 21 | Vertical Total Hi |
| 22 | Vertical Display End Enable Lo |
| 23 | Vertical Display End Enable Hi |
| 24 | Vertical Blanking Start Lo |

| Index | Register |
|---|---|
| 25 | Vertical Blanking Start Hi |
| 26 | Vertical Blanking End Lo |
| 27 | Vertical Blanking End Hi |
| 28 | Vertical Sync Pulse Start Lo |
| 29 | Vertical Sync Pulse Start Hi |
| 2A | Vertical Sync Pulse End |
| 2C | Vertical Line Compare Lo |
| 2D | Vertical Line Compare Hi |
| 40 | Display Pixel Map Offset Lo |
| 41 | Display Pixel Map Offset Mi |
| 42 | Display Pixel Map Offset Hi |
| 43 | Display Pixel Map Width Lo |
| 44 | Display Pixel Map Width Hi |
| 50 | Display Control 1 |
| 51 | Display Control 2 |
| 54 | Clock Frequency Select |
| 70 | External Clock Select Register |

Further, TAC 25 translates memory mapped registers in XGA mode into DRAM addresses where the memory mapped registers are assigned and accessed by the GSP. These memory mapped registers are (XGA Coprocessor Registers-Intel Register Format and Motorola-Register Format):

Page Directory Base Address
Current Virtual Address
State A length State B length
Pixel Map Index
Coprocessor Control
Pixel Map n Base Pointer
Pixel Map n Height
Pixel Map n Width
Pixel Map n Format
Bresenham Error Term
Bresenham K1
Bresenham K2
Direction Steps
Destination Color Compare Condition
Background Mix
Foreground Mix
Destination Color Compare Value
Pixel Bit Mask
Carry Chain Mask
Foreground Color Register
Background Color Register
Operation Dimension 1
Operation Dimension 2
Mask Map Origin Y Offset
Mask Map Origin X Offset
Source Map Y Address
Source Map X Address
Pattern Map Y Address
Pattern Map X Address
Destination Map Y Address
Destination Map X Address
Pixel Operation Any time the host CPU writes data in XGA registers, the decode logic detects the access of the register and produces the detection signal to the CIT 28. Then, the CIT 28 generates a maskable interrupt (MI) signal to the GSP. In response to the MI signal, the GSP updates the contents of the corresponding register built in the DRAM 43. These registers include XGA index registers, XGA memory mapped registers, and video memory.

Figure 6B:
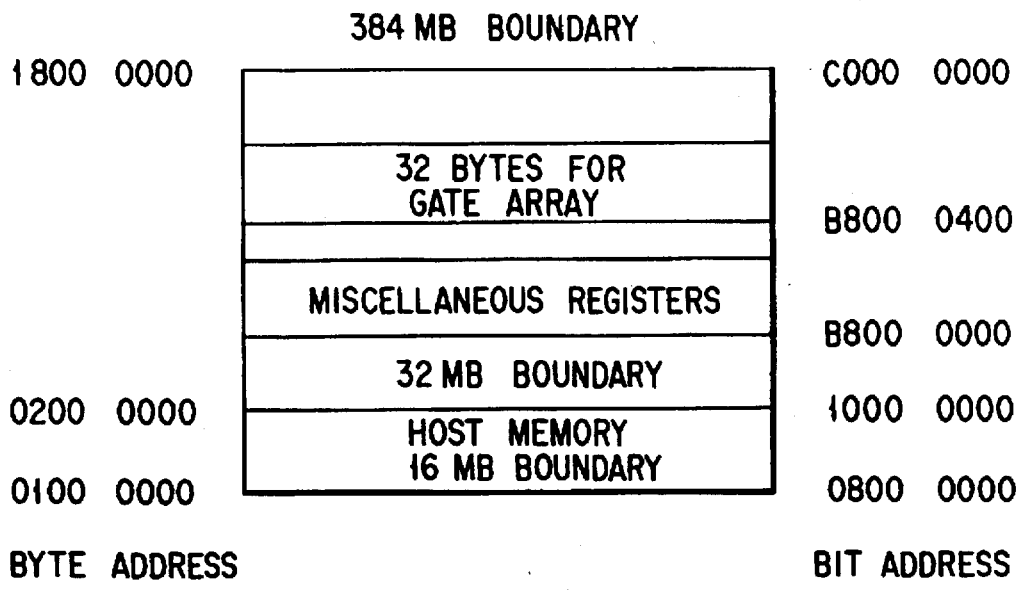
FIGS. 6A through 6C depict a memory map of the system shown in FIGS. 2A and 2B.
Figure 6A:
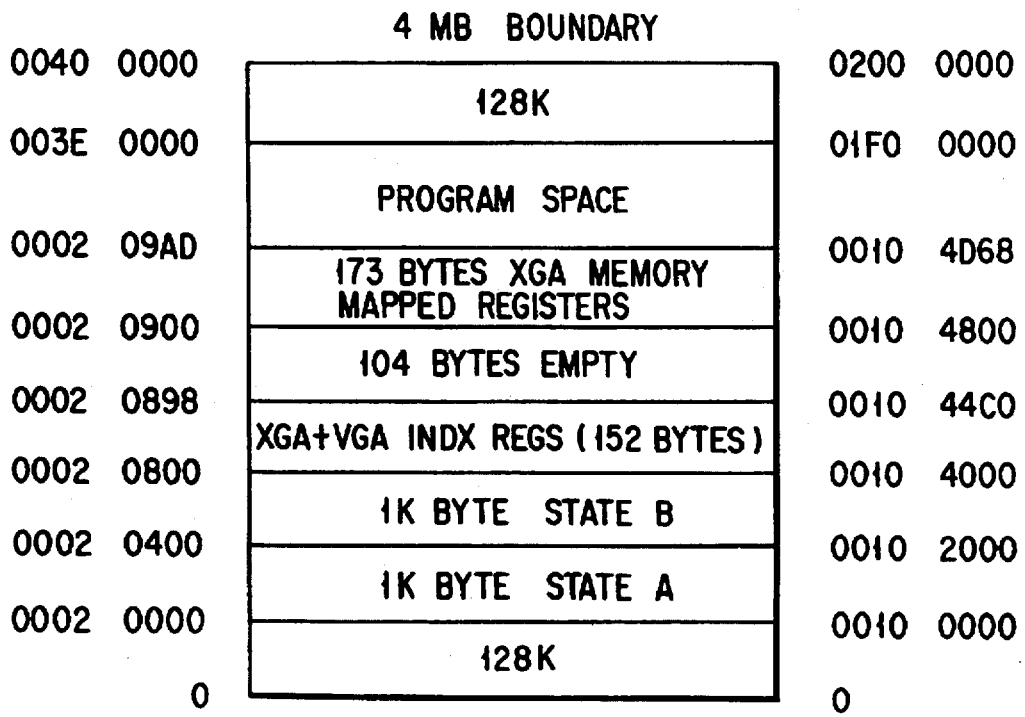
Figure 6C:
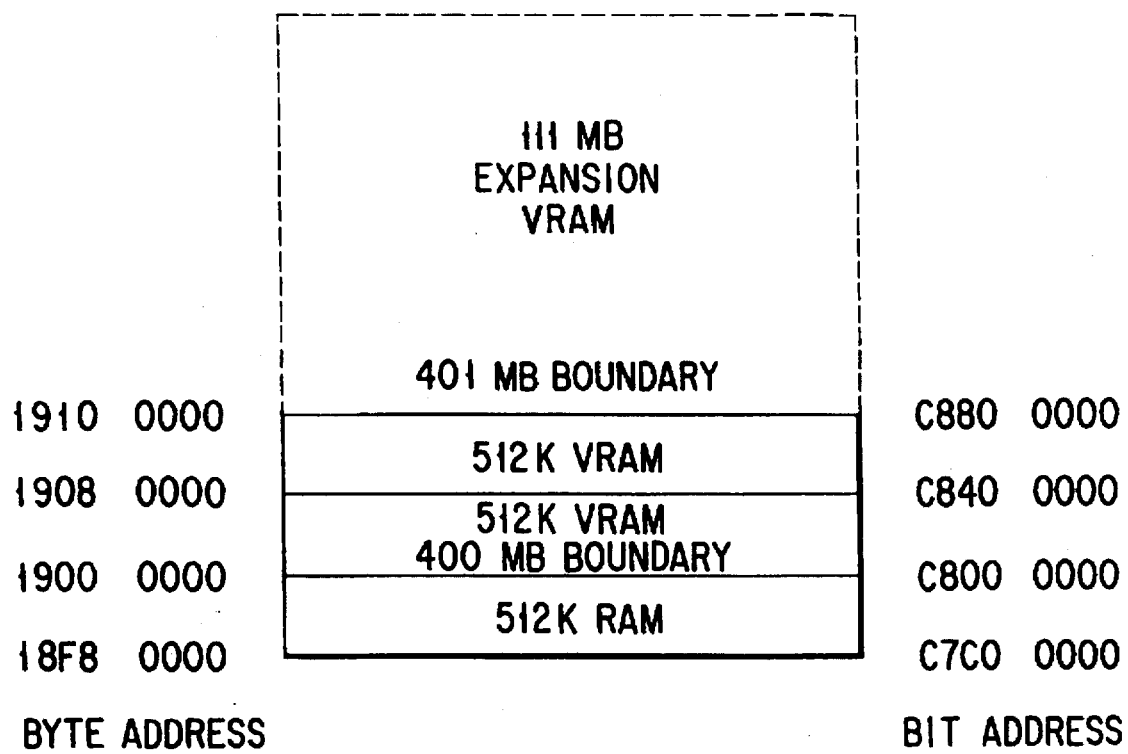

Further, TAC 25 converts addresses of Video Memory supplied from the system bus into addresses comprehensible by GSP 23. FIGS. 6A through 6C show a memory address space accessible by the GSP in which FIG. 6A shows a memory map of the DRAM 43; FIG. 6B shows a memory map including a host CPU main memory (not shown); and FIG. 6C shows a memory map of the VRAM 41. In FIG. 6B, a main memory address space (16 mega bytes) of the host CPU is mapped into byte addresses "0100 0000" through "0200 0000" of the GSP memory address space in order to accommodate the difference between the Host CPU memory cycle and the GSP memory cycle. Therefore, TAC 25 converts the Host CPU memory address into the GSP memory address.

Next, Hidden Registers 57 are included in a preferred embodiment of the present invention to provide a means to communicate with the Totally Awesome Controller (TAC) and the Graphics Controller of the present invention. Because the TAC and Graphics Controller must necessarily be controlled based upon whether Host CPU is sending graphics data in VGA, XGA or 34020 (TIGA) format, Hidden Registers are included at normally unused I/O addresses, and may only be accessed through a unique combination of reads and writes to effectively "unlock" the register. In this way, Hidden Registers 57 will not conflict with the other registers (such as VGA and XGA registers 54 and 55), and will not be inadvertently accessed by an executing program. Thus, Hidden Registers 57 make the TAC fully programmable as will be described in further detail below.

Finally, Address State Machine 59 is present in the TAC to perform any necessary convolution in the addresses generated by the Host CPU. Based upon the status of XGA registers 55, Hidden Registers 57, Host Address lines 63, I/O Control Signals 65 and Memory Control Signals 67, Address State Machine 59 pipes through the appropriate address lines to the Graphics System Processor (element 23 in FIG. 2A) via GSP Address Lines 69, so as to generate appropriate XGA addresses when in an XGA mode. Additionally, Address State Machine 59 adds any necessary address bits to properly place the graphics data from the Host CPU into the appropriate GSP memory space.

In operation, then, the Host CPU generates addresses on Host Address Lines 63, and through the use of input signals from XGA Registers 55, Hidden Registers 57, I/O Control 65 and Memory Control Signals 67, appropriate addresses are generated on GSP Address Lines 69 by the TAC. After these address lines are generated, an appropriate read or write enable signal is provided to the GSP so that data is either read from or written to the VRAM (element 41 in FIG. 2B) through the Graphics Controllers (elements 33 and 35 in FIG. 2A).

The specific operation of the Totally Awesome Controller (TAC) will now be described. Basically, the TAC may receive an indication from an application running on the Host CPU through normal XGA registers 55 that it is to be operating in one of its XGA graphics modes. In addition, the TAC may receive other types of commands affecting the TAC's operation through Hidden Registers 57.

For example, as is commonly known by those of ordinary skill in the art, XGA modes 0 (hex) through 3 (hex) and 7 (hex) are alphanumeric modes while modes 4 (hex) through 6 (hex) and D (hex) through 13 (hex) are primarily graphics modes (herein, the term "hex" indicates that the number is in hexadecimal format-base 16). The XGA Basic Input/Output System (BIOS) found in XGA systems, and readily understood by those skilled in the art, controls the implementation of these modes by utilizing various XGA registers in the video system.

Specifically, several sets of registers exist in a VGA system which allow for the control of the components of the system: namely, General Registers, Attribute Registers, CRT Controller Registers, Sequencer Registers, and Graphics Registers. Furthermore, Direct I/O map Registers (Host Control), Index Registers (CRT control and sprite color lookup table), and Memory Mapped Registers (pixel operation), etc. exist in an XGA system.

Figure 4:
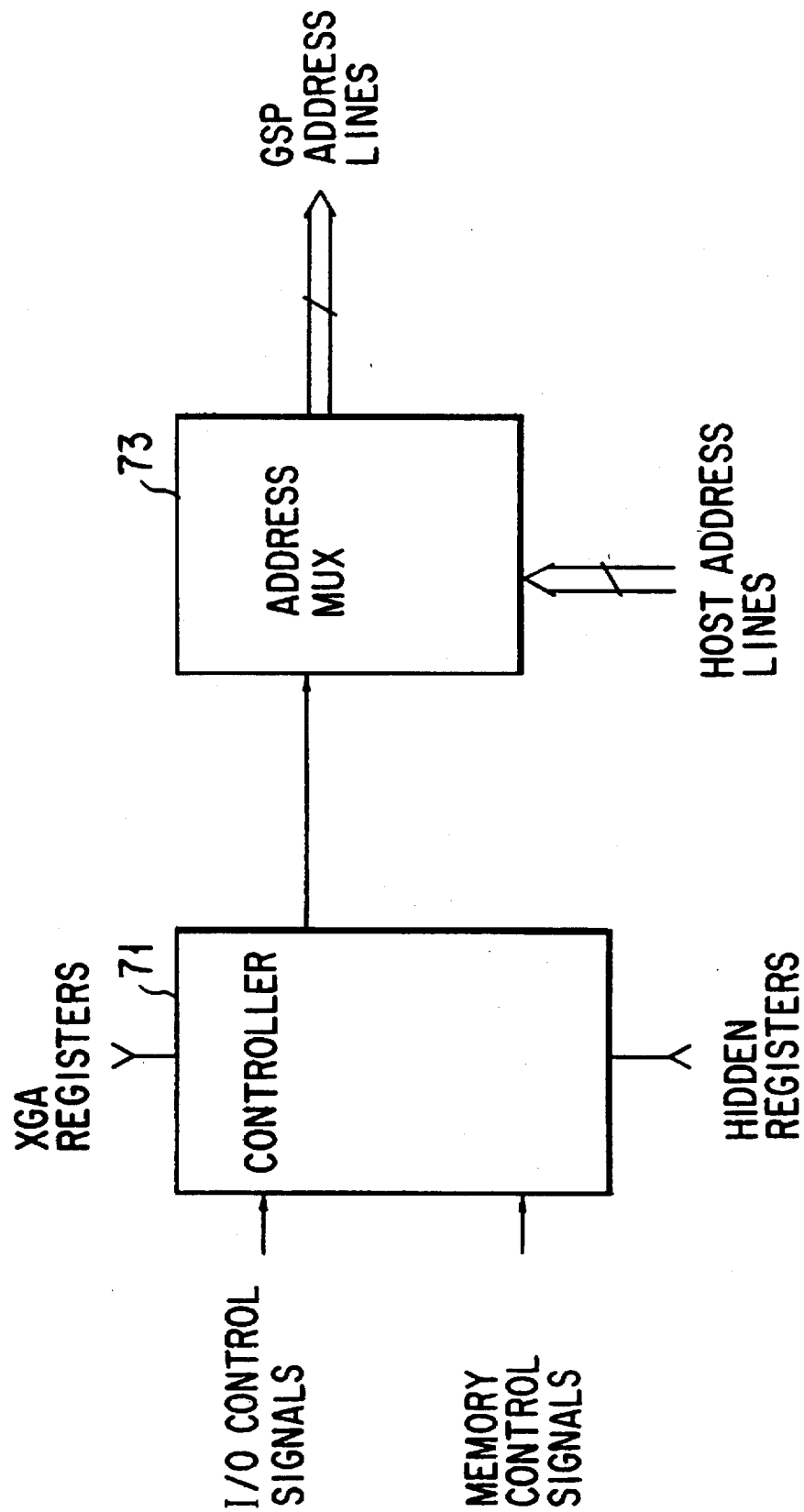
FIG. 4 is a block diagram showing in further detail the address state machine in FIG. 3.

Referring to FIG. 4, a detailed block diagram is shown which depicts the functional operation of Address State Machine 59 of FIG. 3. Specifically, Controller 71 drives Address Multiplexer (Address Mux) 73. Controller 71 receives input signals from I/O control Signals and Memory Control Signals, as well as the XGA Registers and the Hidden Registers previously described.

Thus, Address Mux 73 generates GSP Address lines based upon signals input into both Controller 71 and Address Mux 73, and several different factors are taken into account. Based upon the discussion below with respect to each factor, a person of ordinary skill in the relevant art will readily be able to construct such an Address State Machine out of components which are readily available, such as multiplexers, programmable logic, and related logic gates. The logic equations which may be utilized in arriving at the specific organization of components may also be readily determined based upon the accompanying description of the logic to be performed.

In addition to acting on input from the XGA Registers, Controller 71 also responds to the I/O Control Signals and the Memory Control Signals received from the Host CPU. While the 34020 GSP makes no distinction between I/O and Memory address cycles, the Host CPU in a preferred embodiment does, and therefore these signals are available. In a preferred embodiment, Controller 71 is able to detect that an I/O cycle is being performed and is thus able to control register reads and writes accordingly. Particularly, because many of the registers are duplicated between an XGA system and the 34020 GSP processor (such as those registers which control the CRT Controller), these types of registers may simply be stored in excess memory space (such as VRAM 41 or DRAM 43 in FIG. 2B, depending on availability of space), and thereafter software operating on the 34020 GSP may be used to take the contents of these registers and perform the necessary programming of the appropriate components. Thus, while these common registers might not be stored in a similar format, software on the GSP may make the necessary conversion to program the GSP accordingly.

In order to accomplish this, Controller 71 may be built to detect the presence of an I/O read or write, and to then generate the appropriate addresses corresponding to the memory put aside for use of these registers. This configuration therefore allows both reading and writing of the current state of these registers, which is necessary in order to maintain compatibility with XGA.

In a further embodiment of the present invention, the memory address location where the state of these selected registers is to be stored may be determined through the use of the Hidden Registers which are input into Controller 71 (and which are described further below) or may be preset depending upon the amount of memory installed in the system.

Also, it is important to note that the output from registers which do not have counterparts on the GSP are also handled by the totally Awesome Controller of the present invention (e.g., FIG. 3), which makes the necessary convolutions in addresses, etc. to program the respective registers.

Finally, in addition to acting upon the output of the XGA Registers and the I/O and Memory Control Signals, Controller 41 receives input from the Hidden Registers, as also depicted in FIG. 4. The Hidden Registers instruct Controller 71 to perform one of many functions, which will be described below.

However, before describing how Controller 71 responds to the input from the Hidden Registers, it is important to understand how the Hidden Registers are constructed. Basically, as briefly described before, Hidden Registers are registers which are only accessible when preset combination of reads and writes are executed on an existing register. Any combination of reads and writes may be used, with an emphasis placed on those combinations which are unlikely to occur under normal VGA and XGA operations. In this way, these registers are effectively "hidden" from the normal VGA BIOS and XGA BIOS and the program operating on the Host CPU.

In order to construct hidden registers, one of ordinary skill in the art will readily understand that normal register circuitry may be utilized with the addition of support circuitry to implement the desired logic to effectuate the selective access to the controller which receives the various reads and writes as inputs and cycles through various states. If the correct sequence of reads and writes and data are detected, then such a state machine would couple the hidden register to the particular I/O port.

The first type of operation that Controller 71 may perform responsive to the Hidden Registers relates to moving the XGA video RAM around within the memory available to the GSP. The 34020 GSP uses a 32-bit memory address, and is therefore able to address approximately 4 GBits (512 MBytes) of memory.

Another operation which Controller 71 performs responsive to the Hidden Registers is to allow for the extended features of the 34020 through the Texas Instrument Graphics Architecture (TIGA). Specifically, if the appropriate hidden register is set so as to place the system in TIGA mode (as opposed to one of the XGA modes), then any memory or I/O address generated by the Host CPU will not be translated or convoluted by the TAC, but will instead be provided verbatim to the 34020 GSP. This is necessary because TIGA, which was designed for use on the 34020 GSP, manages its own memory addressing, and therefore has no need for the TAC.

The Graphics Controller

Referring back to FIG. 2A, Graphic Controllers 33 and 35 are depicted. Basically, Graphics Controllers 33 and 35 perform the identical function of the VGA and XGA graphics controllers, defined previously. However, Graphics Controllers 33 and 35 of the present invention provide some additional functionality not found in normal VGA and XGA graphics controllers in order to maintain compatibility with TIGA.

The reason that the two Graphics Controllers 33 and 35 are utilized in a preferred embodiment of the present invention is to achieve better throughput of data between Bus 29 and DRAM 43 or VRAM 41. However, as will be understood by one of ordinary skill in the art, one graphics controller may just as easily be used in the present invention, albeit with a reduction in effective throughput. If only one graphics controller is used, then two successive operations will need to be performed in order to transfer two 8-bit bytes of data.

Because Graphics Controllers 33 and 35 may be used, in a preferred embodiment, while the application program running on the Host CPU is generating graphics in either XGA or TIGA mode, the Graphics Controllers must necessarily be able to distinguish between these two modes. As may be seen in FIG. 2A, Hidden Registers 37 and 39, which form part of the same hidden registers previously discussed, provide the necessary input to Graphics Controllers 33 and 35 to indicate which mode is being used.

In order to implement Graphics Controllers 33 and 35 of the present invention (or only one graphics controller if only one is to be used), additional circuitry must be present in order to allow for the graphics controller to be selectively activated based upon what type of graphics mode is being used. One of ordinary skill in the art will recognize that a graphics controller known in the art may be readily modified according to the present invention so as to include logic to selectively activate such graphics controllers responsive to the state of the appropriate hidden registers. For VGA mode, if the bit-plane format is used, the graphics controller will operate in a similar fashion to its operation on a dedicated VGA system. On the other hand, if a non-bit-plane format is used, then data may be piped straight through with no modification to the data.

In XGA mode, only packed pixel format is used, and the data may be piped straight through with no modification to the data.

Figure 7:
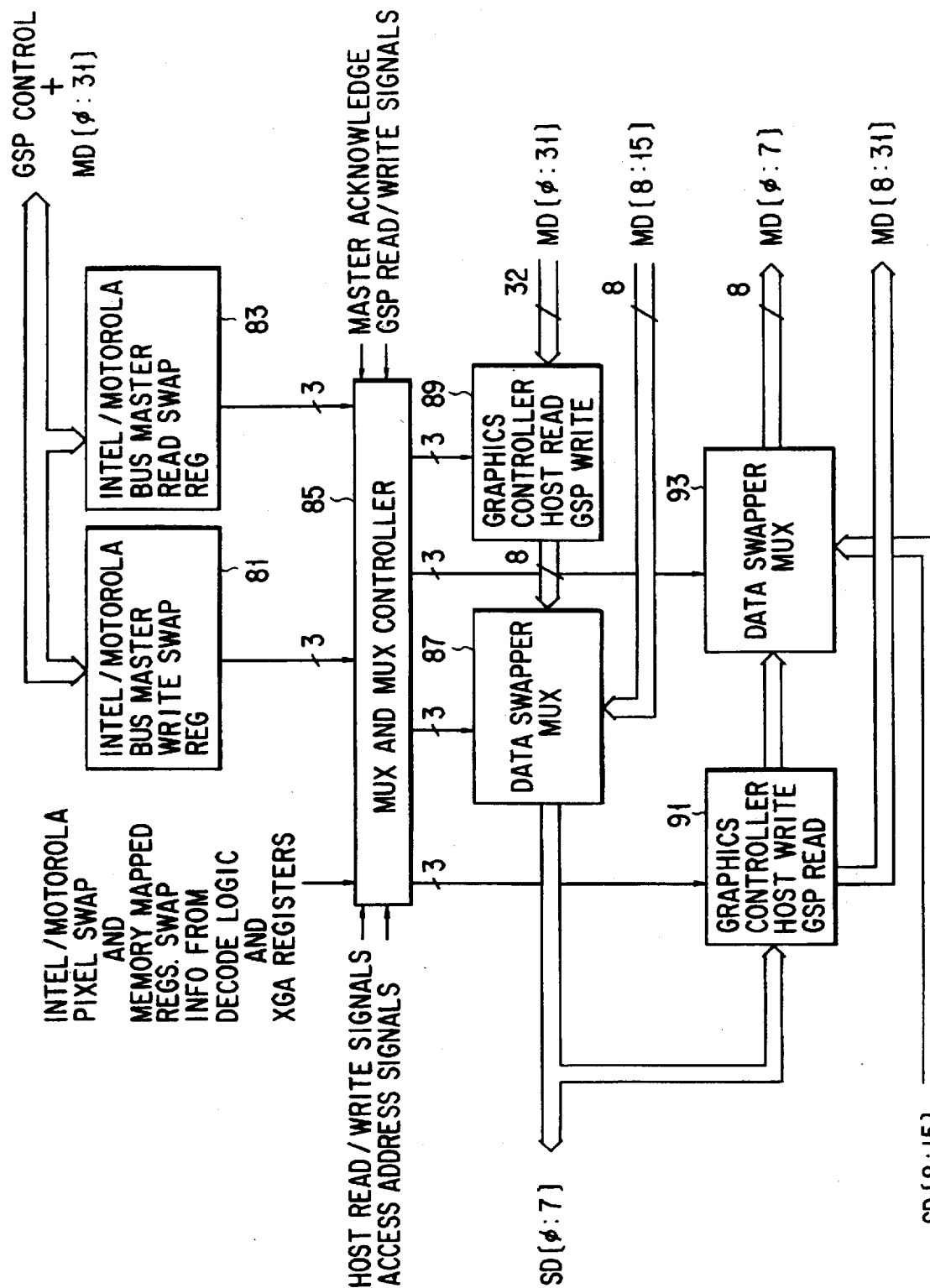
FIG. 7 is a block diagram showing in detail the graphics controller depicted in FIG. 2A.

FIG. 7 shows a detailed block diagram of the graphics controller. Although the details of only one graphics controller is shown in FIG. 7, the other graphics controller has the same logic. One of the unique features of the present invention is the provision of the data swap multiplexer in the graphics controller. The data swap multiplexers 87 and 93 swap Intel format to Motorola format or Motorola format to Intel format. FIGS. 8 and 9 show the Intel format and the Motorola format, respectively. The table represents the first three bytes of the memory map in Intel or Motorola Order, and shows the layout of the pixels within them for all pixel sizes (bpp=bits-per-pixel). Each of XGA memory space and GSP memory space is always Intel format only. Accordingly, the data written by the host CPU in Motorola format must be written in GSP memory in Intel format. Alternatively, the data read out from the GSP memory must be changed to the Motorola format. The designation of the Intel or Motorola format is performed by using Memory Access Mode Register and the Pixel Map n Format Register.

The Intel/Motorola Bus Master Write Swap Register 81 is an 8-bit register storing format translation parameters and is used only on busmastership writes. Depending on the value of this register, Motorola format translation can occur for different pixel widths.

| Bits [0:2] | Description Motorola Format |
|---|---|
| 0 | No Pixel Swapping |
| 1 | 1 Bit/Pixel Sw6p |
| 2 | 2 Bit/Pixel Swap |
| 3 | 4 Bit/Pixel Swap |
| 4 | 16 Bit/Pixel Swap |

Note that XGA does not support a 16 Bit/Pixel format. Mode 4 of this register is only for extended functions (i.e., TIGA). Bit 0 is the least significant bit.

The Intel/Motorola Bus Master Read Swap Register 83 is an 8-bit register storing format translation parameters and is used only on busmastership reads. Depending on the value of this register, Motorola format translation can occur for different pixel widths.

| Bits [0:2] | Description Motorola Format |
|---|---|
| 0 | No Pixel Swapping |
| 1 | 1 Bit/Pixel Swap |
| 2 | 2 Bit/Pixel Swap |
| 3 | 4 Bit/Pixel Swap |
| 4 | 16 Bit/Pixel Swap |

Note that XGA does not support a 16 Bit/Pixel format. Mode 4 of this register is only for extended functions (i.e., TIGA). Bit 0 is the least significant bit.

The XGA Coprocessor can manipulate images with 1, 2, 4 or 8 bits per pixel. It manipulates packed-pixel data, so each data double-word (32 bits) contains 32, 16, 8 or 4 pixels respectively. The pixels can be in one of two different formats, "Motorola" or "Intel". Each pixel map manipulated by the Coprocessor can be defined as either Motorola or Intel format. If the Destination Map has a different format to that of the Source, Pattern or Mask Maps, the Coprocessor automatically translates between the two formats. Motorola or Intel format is controlled by a bit in the Pixel Map Format Register.

In the course of executing an operation, the Coprocessor reads in Source, Pattern and Mask data, and reads and writes Destination data. The Source, Pattern and Mask data can either be fixed throughout the operation, or vary from pixel to pixel. If pixel data is to be used, the data is written to the relevant fixed data register in the Coprocessor before the operation is started (Foreground and Background Color Registers).

If variable data is required, the data is read from memory by the Coprocessor during the course of the operation. The Coprocessor only allows variable data to be provided from memory, and does not allow the system unit processor to supply variable data. The Coprocessor treats video memory and system memory in the same manner thus data can be moved between system memory and video memory by defining pixel maps at the appropriate addresses. Accesses to the XGA video memory are faster than accesses to system memory. The Coprocessor can address all the video memory. The Video Memory Base Address Registers hold a value that indicates the base address at which the video Memory appears in system address space. This base address is on a 4 MB address boundary. The Coprocessor assumes that the whole 4 MB of address space above this boundary is reserved for its own video memory. All address outside this 4 MB block are treated as system memory.

The XGA subsystem Video Memory is accessed in system memory address space through three possible "apertures". These are: The 4 MB Aperture: This aperture allows all of Video Memory to be addressed consecutively. If an access is made at an offset higher than the amount of memory installed, no memory is written and undefined values are returned when read.

The 1 MB Aperture: This aperture allows up to 1 MB of video Memory to be addressed consecutively. If an access is made at an offset higher than the amount of memory installed, no memory is written and undefined values are returned when read.

The 64 KB Aperture: This aperture allows up to 64 KB of video Memory to be addressed consecutively. This aperture can be located at any 64 KB section of the Video Memory using the Aperture Index Register.

The Coprocessor defines three general purpose pixel maps in memory, called Pixel Maps A, B and C. Each map is defined by four registers:
Pixel Map Base Pointer This specifies the linear start address of the map in memory.

Pixel Map Width

This specifies the width of the map in pixels. The value programmed should be 1 less than the required width.

Pixel Map Height

This specifies the height of the map in pixels. The value programmed should be 1 less than the required height.

Pixel Map Format

This specifies the number of bits-per-pixel of the map, and whether the pixels are stored in Motorola or Intel format.

The Source, Pattern and Destination data can each reside in any of Pixel Maps A, B or C, determined by the contents of the Pixel Operations Register. These maps may be defined to any arbitrary size up to 4096 by 4096 pixels. Individual pixels within the maps are addressed using X, Y pointers. Pixel Maps can be located in video memory and in system memory. There are two restrictions on map usage: the Source and Destination maps must have the same number of bits-per-pixel, and the pattern map must be 1 bit-per-pixel.

In addition to the 3 general purpose maps, the Coprocessor also defines a Mask Map. This Map is closely related to the Destination map. It allows the Destination to be protected from update on a pixel-by-pixel basis, and can be used to provide a scissoring-type function on any arbitrary shaped area. The Mask Map is described by a similar set of registers to the general purpose pixels maps A, B and C, but it is fixed at 1 bit-per-pixel.

Mux and Mux Controller 85 receives parameters from the registers 81 and 83, Host Read/Write Signals from the Host CPU, Decode Logic signals from the Decode Logic 31, Master Acknowledge signal from the Bus Master Circuit to be described later, and the GSP Control Signals from the GSP 23. Furthermore, the MUX and MUX Controller 85 receives Intel/Motorola Pixel Swap Information from Operating Mode Register, Pixel Maps A, B, and C from memory mapped Pixel Operations Register, and I/O access from the Decode Logic. Upon receiving the Master Acknowledge signal, the Mux and Mux Controller 85 uses the GSP Read/Write Control signals. However, upon receiving no Master Acknowledge signal, the Controller 85 uses the Host Read/Write Signals.

Graphics Controllers 89 and 91 are similar to those of VGA Graphics Controllers of IBM, for example. The detailed description of these Graphics Controllers 89 and 91 are described in U.S. application Ser. No. 07/785,935 filed by the same inventor, and thus the detailed description thereof will be omitted. The Data Swapper Multiplexers 87 and 93 perform data swapping operations in accordance with the designation of Intel format or Motorola format.

Furthermore, according to the present invention, the XGA memory mapped registers are software emulated. The Host Decode Logic 31 detects the address of the XGA memory mapped register and the TAC 25 translates the address into a GSP memory address. These XGA registers are mapped in the DRAM 43 as follows:

| Bit Address | Description |
|---|---|
| 0010 4800h | Page Directory Base Address |
| 0010 4820h | Current Virtual Address |
| 0010 4860h | State A Length |
| 0010 4868h | State B Length |

-continued

| Bit Address | Description |
|---|---|
| 0010 48A0h | Pixel Map 0 Base Pointer |
| 0010 48C0h | Pixel Map 0 Width |
| 0010 48D0h | Pixel Map 0 Height |
| 0010 48E0h | Pixel Map 0 Format |
| 0010 4900h | Bresenham Error Term (Read/Write) |
| 0010 4920h | Bresenham k1 |
| 0010 4940h | Bresenham k2 |
| 0010 4960h | Direction Steps |
| 0010 4A40h | Foreground Mix |
| 0010 4A48h | Background Mix |
| 0010 4A50h | Destination Color Compare Condition |
| 0010 4A60h | Destination Color Compare Value |
| 0010 4A80h | Pixel Bit mask |
| 0010 4AA0h | Carry Chain Mask |
| 0010 4AC0h | Foreground Color Register |
| 0010 4AE0h | Background Color Register |
| 0010 4B00h | Operation Dimension 1 |
| 0010 4B10h | Operation Dimension 2 |
| 0010 4B60h | Mask Map Origin X Offset |
| 0010 4B70h | Mask Map Origin Y Offset |
| 0010 4B80h | Source Map X Address |
| 0010 4B90h | Source Map Y Address |
| 0010 4BA0h | Pattern Map X Address |
| 0010 4BB0h | Pattern Map Y Address |
| 0010 4BC0h | Destination Map X Address |
| 0010 4BD0h | Destination Map Y Address |
| 0010 4BE0h | Pixel Operation |
| 0010 4C20h | Pixel Map 1 Base Pointer |
| 0010 4C40h | Pixel Map 1 Width |
| 0010 4C50h | Pixel Map 1 Height |
| 0010 4C60h | Pixel Map 1 Format |
| 0010 4CA0h | Pixel Map 2 Base Pointer |
| 0010 4CC0h | Pixel Map 2 Width |
| 0010 4CD0h | Pixel Map 2 Height |
| 0010 4CE0h | Pixel Map 2 Format |
| 0010 4D20h | Pixel Map 3 Base Pointer |
| 0010 4D40h | Pixel Map 3 Width |
| 0010 4D50h | Pixel Map 3 Height |
| 0010 4D60h | Pixel Map 3 Format |

BUS MASTERSHIP

Figure 10:
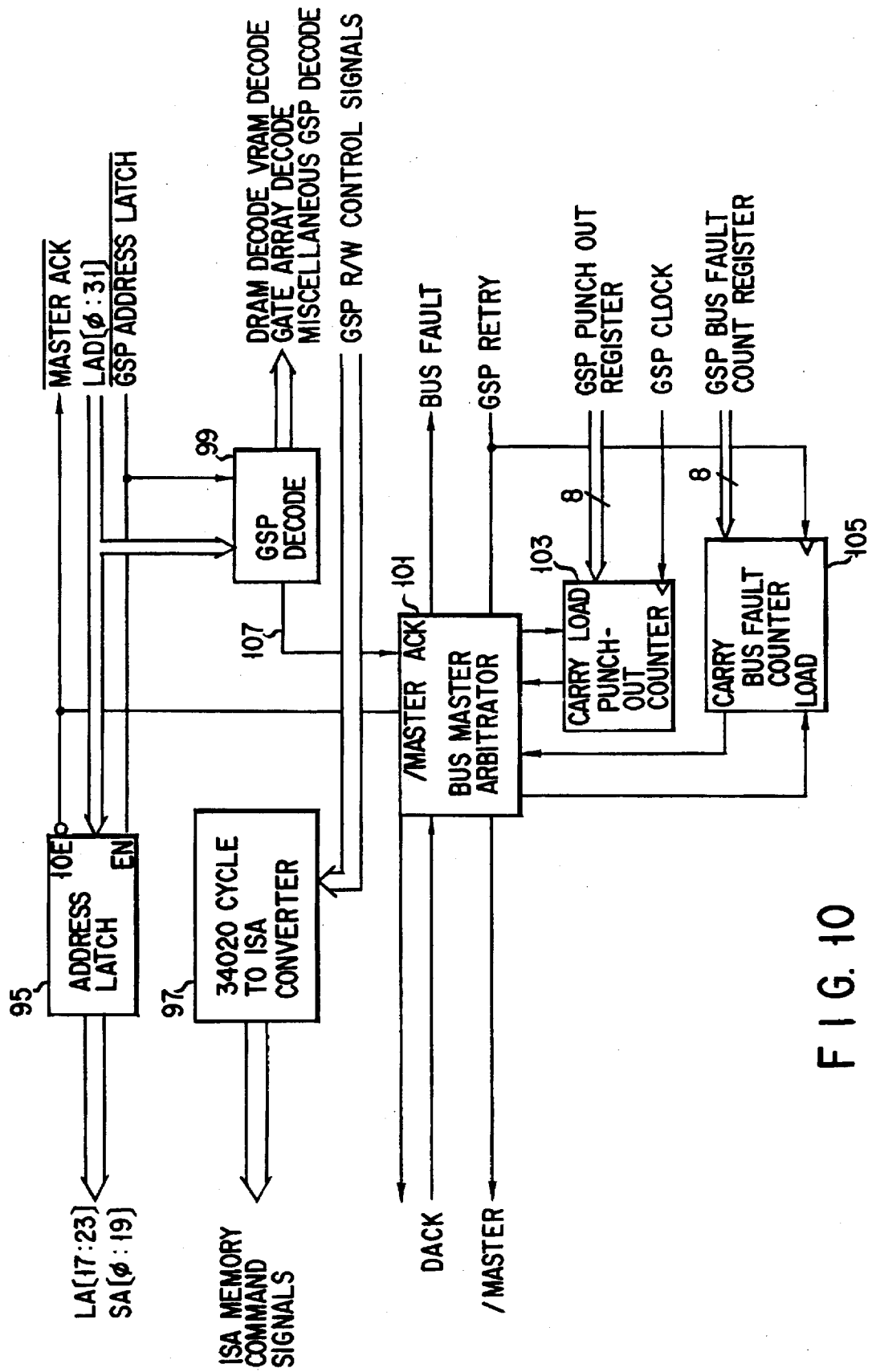
FIG. 10 is a block diagram showing in detail the bus mastership depicted in FIG. 2A.

The IBM arbitrator does not understand GSP logic. For example, the time from bus request to becoming the bus master will be 1 microsecond minimum in the case of an XGA subsystem but the time will be 200 nanoseconds in the case of GSP. Accordingly, the GSP must suspend its operation until it receives a bus master signal. On the other hand, the GSP must perform various things such as the refreshing of the video Memory and the DRAM, managing of the video cycles and processing of various interrupts. In order to eliminate these drawbacks, according to the present invention, Bus Master Arbitrator 101 (FIG. 10) issues a GSP retry signal to the GSP. In response to the GSP retry signal, the GSP issues the Bus Request signal again to the Bus Master Arbitrator. If the Bus is busy, the Bus Master Arbitrator issues a GSP retry signal which is supplied to the Bus Fault Counter 105. The number of GSP retry signals is counted by the Bus Fault counter 105 which is programmable. One of the tasks that the GSP must do is a split display. More specifically, the upper half of the screen is subjected to panning and the lower half of the screen is not subjected to panning. This control is done by hardware in the case of XGA. However, the present invention performs this control by software. Accordingly, immediately before scanning the last line of the upper half of the screen, the MI (Maskable Interrupt) signal is issued to the GSP. In response to the MI, the GSP performs no panning on the lower half of the screen. In order to realize this, the bus fault counter counts the GSP retry signals up to the programmably set value. If the counted value reaches the preset value, then the bus fault counter issues a bus fault signal which serves as the MS signal.

Furthermore, Punch-Out Counter 103 is provided in order to issue a punch-out signal for every 15 microseconds, for example. The AT bus has no bus arbitrator, and therefore, once the GSP holds the bus it can hold it forever. If the GSP holds the bus forever, the HOST refresh circuit fails to perform the refreshing operation. In order to avoid this, the GSP is forced to release the bus thereby ensuring the refreshing operation.

Furthermore, the GSP timing and the host CPU timing are different. Therefore, in order to tailor the GSP timing to the host CPU timing, GSP cycle to ISA converter 97 is provided. More specifically, the 34020 GSP cycle is faster than the AT bus cycle. In order to tailor the 34020 cycle to AT bus cycle, the 34020 Cycle To ISA Converter comprises a bunch of flip-flops to delay the GSP read/write control signals and output the ISA Memory Command signals.

The DREQ signal (DMA request signal), DACK signal (DMA acknowledge signal) and MASTER signal are used to control the Bus Mastership. More specifically, upon receiving the DREQ signal from the Bus Master Arbitrator 101, a DMA controller holds a host CPU and isolates the host CPU from the Bus. Thereafter, the DMA controller sends back the DACK signal to the Bus Master Arbitrator. On the other hand, upon receiving the Master signal from the Bus Master Arbitrator, the DMA controller isolates itself from the Bus.

In response to a GSP Address Latch signal, the Address Latch 95 latches the AT bus address lines LA[0:31] and outputs as ISA bus address lines SA[0:19] and AT address lines LA[17:23] in response to the MASTER ACK signal.

The GSP Decode Logic 99 decodes addresses of DRAM 43, VRAM 41, Gate Array 47 (to be described later), and Miscellaneous registers. The GSP Decode Logic 99 issues an Enable signal 107 to the Bus Master Arbitrator 101 when it decodes a Host Memory Address.

Figure 11:
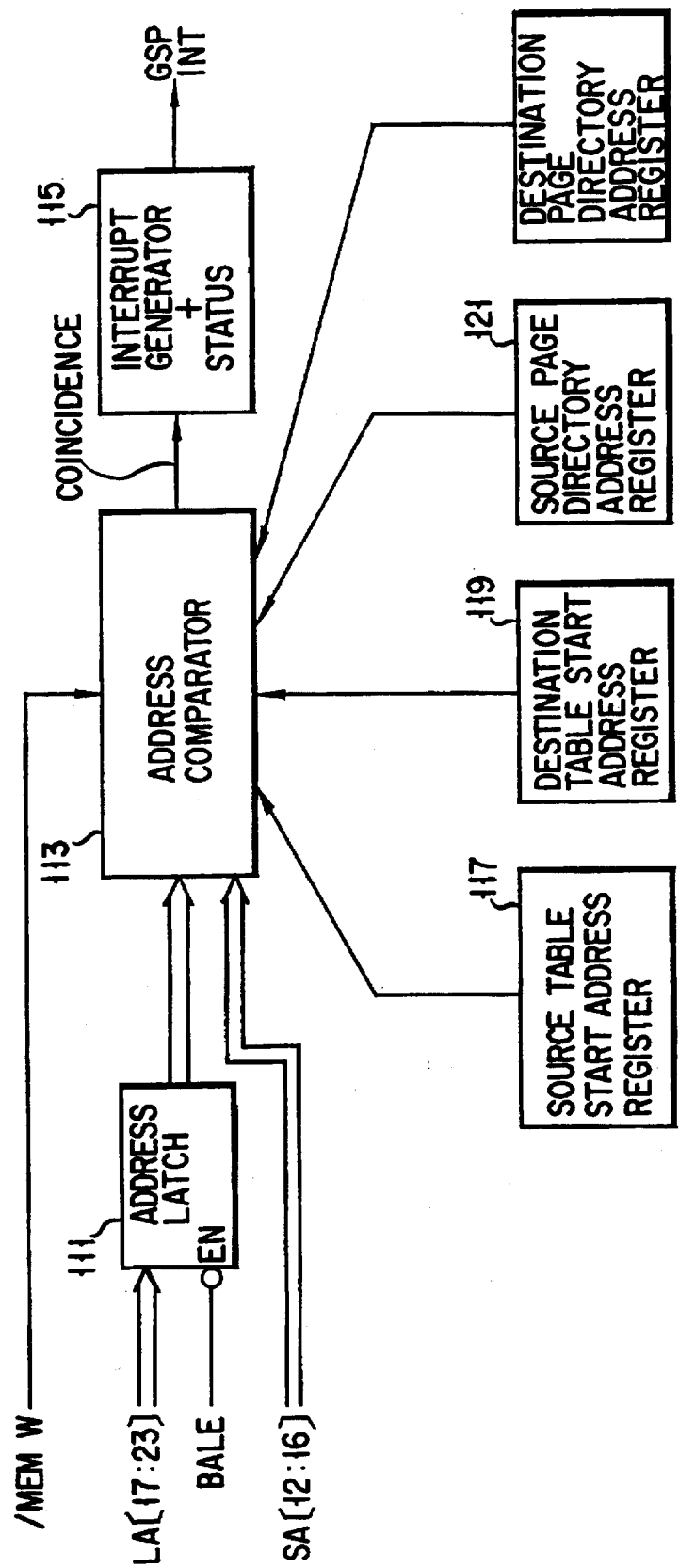
FIG. 11 is a block diagram showing in detail the snoop logic depicted in FIG. 2A.

FIG. 11 shows a block diagram of a Translate Lookaside Buffer Snoop circuit.

The XGA Coprocessor can address either real or virtual memory. When addressing real memory, the linear address calculated by the Coprocessor is passed directly to the host system or local video memory. When addressing virtual memory, the linear address from the Coprocessor is translated by on-chip Memory Translation logic before the translated address is passed to the host system, or local Video Memory. Virtual Address Translation is enabled or disabled by a control bit in the XGA.

The Coprocessor uses two levels of tables to translate the linear address from the Coprocessor to a physical address. Addresses are translated through a Page Directory and Page Table to generate a physical address to memory pages that are 4 KB in size. The Page Directory and Page Tables are of the same form as those used by the 80386 processor Paging Unit.

The linear address from the Coprocessor is divided into 3 fields that are used to look-up the corresponding physical address. The fields are called the Directory Index, the Table Index and the Offset, and are shown in FIG. 12.

The location of the Page Directory is at a fixed physical address in memory that must be on a page (4 KB) address boundary. The Coprocessor has a Page Directory Base Address register that should be loaded with the address of the Page Directory Base. The translation process is shown in FIG. 13.

The Host CPU may be comprised of an 80386 microprocessor manufactured by Intel Corp. The 80386 microprocessor has a virtual paging function but the GSP does not have it. Suppose that the GSP is performing a 4K bytes block transfer. If the host CPU updates a certain location of the block, the GSP will not know the change. In order to avoid this, the Address Comparator 113 monitors the access of the host CPU. Upon detecting a access of the location in which the GSP is transferring data, the Comparator and issues a detection signal to the Interrupt Generator and Status 115. In response to the detection signal, the Interrupt Generator and Status 115 generates a GSP Interrupt signal to the GSP.

The Address Latch 111 latches the AT bus address LA[17:23] in response to the bus address latch signal BALE. The Address Comparator 113 receives the AT bus address from the Address Latch 111 and ISA bus address SA[12:16] and compares a combination of both addresses with Source Table Start Address Register 117, Destination Table Start Address Register 119, and Page Directory Address Registers 121, 122 in response to the memory write signal/MEMW. The Page Directory Address Register 121 holds the directory address ("52" in the embodiment in FIG. 13). The Source Table Start Address Register 117 holds an address stored in a location of the directory designated by the address "52", namely "1000" in FIG. 13. Furthermore, the Destination Table Start Address Register 119 holds a value stored in another location of the directory, namely "100" in FIG. 13. The Comparator 113 checks whether the combination of the supplied addresses is within a 4 KB address space from the Source Table Start Address or the Destination Table Start Address. If it is affirmative, the Comparator 113 issues a coincidence signal to the Interrupt Generator and Status 115. Upon receiving the coincidence signal, the Interrupt Generator and Status 115 issues the GSP Interrupt signal to instruct the GSP to translate the Host CPU address into a GSP address. If the address change is not caused within the 4 KB, the GSP will perform the block transfer of 4 KB contiguously without translating the Host CPU address into a GSP address byte by byte. The above arrangement permits the GSP to translate only once for every 4K bytes, resulting in improved high-speed processing and reduction of overhead in the GSP.

In order to accomplish split screen functionality, the present invention, in a preferred embodiment, utilizes the "line interrupt" capabilities of the 34020 GSP. Line interrupts allow this, and other GSPs, to be interrupted at specific lines during the display of these lines. Line interrupts are commonly used for cursor control.

Split screens may be implemented by taking advantage of these line interrupts. For example, two flips-flops (such as 274S) may be hooked up as a piped register to receive a line interrupt signal.

For illustrative purposes, suppose that the top portion of the split display is using pixel panning, while the bottom portion is not. A line interrupt is set for the line before the transition from the top portion of the split screen to the bottom portion.

Thus, on the line before the split is to take place, the flip-flops are clocked to receive the line interrupt signal in such a way so as to kill the pixel panning than during the blanking time interval, rather during the display time interval. This prevents the display from shaking because the transition occurs while the display is in a blanking state. Once the vertical retrace occurs, the panning that was in effect for the top of the display is restored, and the whole cycle begins again.

In the XGA mode, the pixel panning is emulated by software. More specifically, the 64 Bits are panned by software in the XGA mode. If a pixel is constituted by 8 bits, then 8 pixels are panned at one time.

Line interrupts are used to accomplish many types of functions, such as split screens (described above), cursor control, as well as other uses (which will be described below). Because of this, a type of "interrupt controller" must be utilized in a preferred embodiment of the present invention in order to distinguish the various types of interrupts from one another. As an alternative to using a commonly available, full-blown interrupt controller to accomplish this functionality, a unique type of interrupt handling device is used in a preferred embodiment. In order to distinguish it from an interrupt controller, this device will be referred to as a "command interrupt flag tag" (CIT) (28 in FIG. 2A). Of course, this designation is used only to demonstrate that the CIT is not a true interrupt controller, and should not be construed to have any meaning not given to it in the present specification.

Specifically, in a preferred embodiment, the CIT includes a 32-bit register that flags which interrupt routine should be run when an interrupt is generated by an application running on the Host CPU accessing software emulated VGA and XGA registers or other emulated areas of VGA and XGA. Each bit of the register corresponds to a groups of related functions which may be effected by the Host CPU, and which call for display changes to be made by the GSP. Examples of such functions represented by a bit of the CIT register (and the related register name in parentheses) in a preferred embodiment include: Clock Select (MISCR, CLKSEL), Screen On/Off-Clock Setup (SR01H), Character Map Select (SR03H), Attribute Mode Control (AR10H), Overscan Color (AR11H), Color Plane Enable (AR12H), Horizontal Pixel Pan (AR13H), Horizontal CRT Controls (CR00, 01, 02, 03, 04, 05H, HRTC), Vertical CRT Controls (CR06, 07, 10, 1, 12, 15, 16H, VCRTC), Cursor Control (CR0A, 0B, 0E, 0FH, CURCONT), Pan and Scroll Info (CR08H, CR18H, PANSCROLL), Memory Start Offset (CR0CH, CR0DH, MEMST), Memory Setup (offset/pitch) (CR13H, MEMSETUP), General Mode Control (CR17H, MODECONT), Misc. Data and Mode Control (CR09H, CR14H, MISCCONT), BIOS Access (Seq. Reg. Index 128, EXTREG), Graphics Controller Mode Info (GR05H, GR06H, GCMODE), etc.

According to the present invention, in order to improve performance, the CIT may generate an interrupt of the GSP only when the Host CPU effects a change to a register which necessitates action to be taken, such as a new graphics mode. If no action is necessary, the GSP is not interrupted. This functionality may be accomplished, in a preferred embodiment, when such a register is dual ported, meaning that the contents of the register may be read out. The logic function XOR (exclusive OR) may thereby be utilized to compare the new value written by the Host CPU for the register with the value currently within the register. If the result of the XOR indicates that the values are the same, no action need be taken by the CIT, and thus, the GSP need not be interrupted.

In order to further improve efficiency, registers represented by the CIT may also be grouped together, where functions with similar characteristics may be in the same group. In this case, when one register gets updated, it is likely that the registers within the same group will also be updated. In this way, the CIT is able to interrupt the GSP once to update several different functions, instead of once for each updated register. Thus, one bit of the CIT might represent more than one register.

Once an interrupt has been generated to the GSP, the GSP may then scan through the CIT registers and see which register caused the interrupt to occur. Once this has been determined by seeing which CIT bits are set, the appropriate routine or routines may then be executed on the GSP to handle the changes in these registers. In this way, the GSP need not process those registers which have not been modified.

Another feature of the CIT which may be included to improve performance, and is included in a preferred embodiment, is that the CIT's bits are cleared after the GSP scans the bits to see which routine to execute. In this way, the GSP does not need to specifically go and clear the CIT register bits, but may rely on the CIT to clear its own bits upon the GSP's reading of the CIT register. The actual clear operation may be responsive to a clear pin on the CIT register latches.

Finally, a mask register may be included within the CIT to allow the user to mask off certain registers from being allowed to interrupt the GSP. For example, if the user did not want a change in a certain register to generate an interrupt on the GSP, a mask bit corresponding to the CIT register bit for the particular register could be set or reset to indicate that this particular register is not to be processed by the GSP.

The above discussion of the CIT describes a device for use with the present invention in a preferred embodiment which may be readily constructed by one of ordinary skill in the art by using commonly available latches, logic gates, and/or programmable logic.

The "Back End"

Referring back to FIGS. 2A and 2B, the remaining elements of the present invention will now be discussed. Particularly, Attribute Controller 45, Back End Gate Array 47, and Cathode Ray Tube (CRT) 50 will be explained in detail.

In standard XGA systems, the output of the VRAM feeds back into the XGA device to perform extended features under control of an attribute controller. Basically, under XGA, the attribute control registers, previously discussed, control various aspects of the operation of the attribute controller, such as the attribute address, palette mapping, attribute mode control, overscan color for the display border, color plane enabling, horizontal pixel panning, and color selection. Details of the programming of such registers are commonly known to those of ordinary skill in the relevant art.

Particularly, in a preferred embodiment of the present invention, many of the functions of the attribute controller are emulated in software. For example, the "Enable Line Graphics Character Codes" function of the Attribute Mode Control Register (located in bit 2 of the Attribute Control Registers at Port 03C0 hex, with an index of 10 hex) may be easily software emulated. In short, this function involves enabling the special line graphics character codes by forcing the ninth (9th) dot of a line graphics character to be identical to the eighth (8th) dot of the character. By doing this, a visual continuum will result and the graphics characters will appear to be seamlessly interconnected. The software emulation for this function may be accomplished by replicating the eighth bit into a ninth bit memory location, rather than relying on hardware to perform this function.

Figure 14:
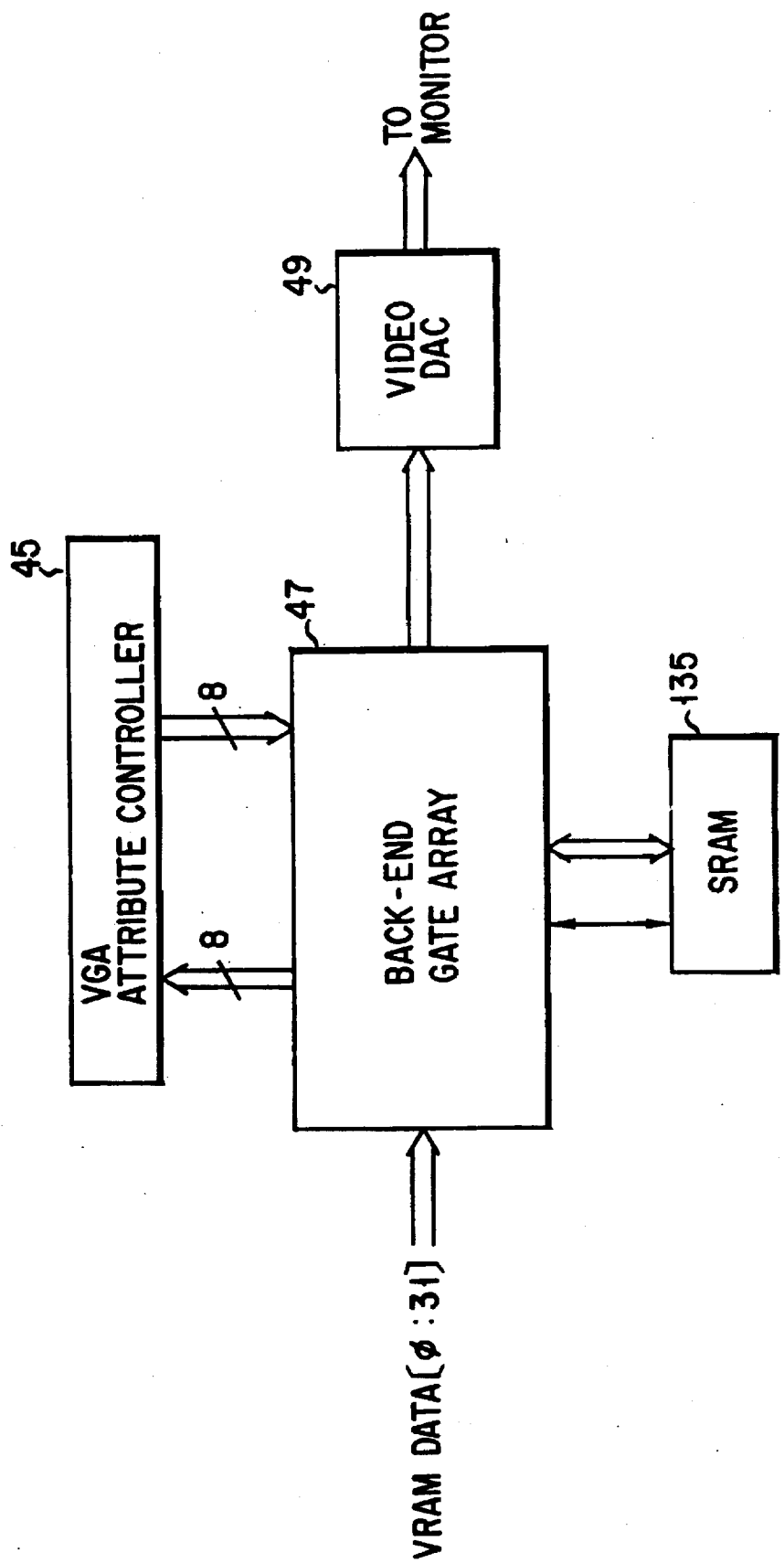
FIG. 14 is a block diagram showing the back-end gate array and its peripherals depicted in FIG. 2B.

FIG. 14 shows a block diagram of a "Back End" gate array 47 and its peripherals. In order to support the VGA mode, the Back-End Gate Array 47 is connected to a VGA Attribute Controller 45. The Attribute Controller 45 includes color palette registers and color select registers to produce color select data. This color select data is supplied to a video DAC 49 to select one of 256 color registers. The details of the Attribute Controller are described in U.S. Ser. No. 07/785,935 filed by the same inventor. Since in the XGA mode, the Attribute Controller is not needed, the description of the Attribute Controller will be omitted.

Figure 15B:
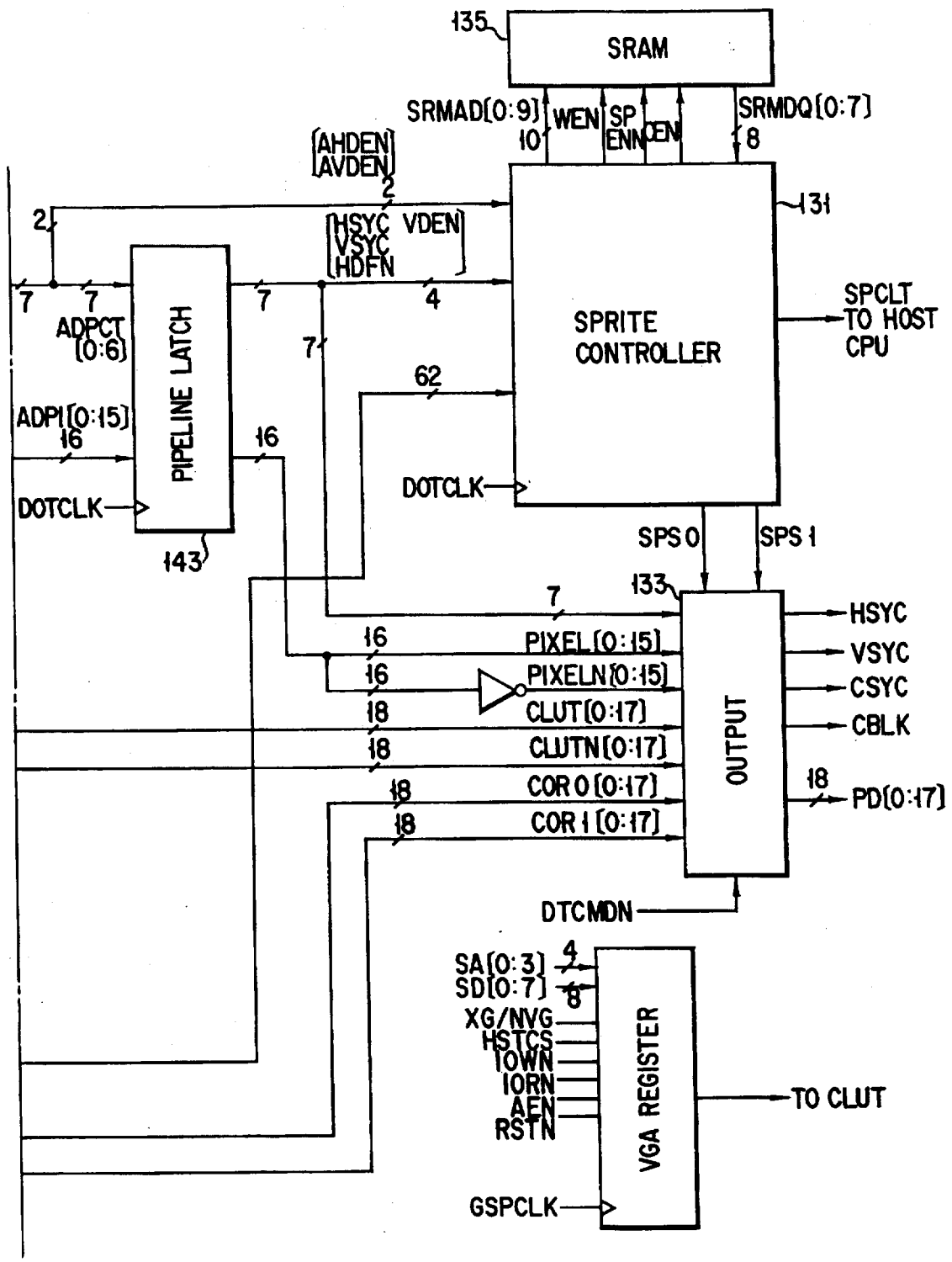

FIG. 15 is a detailed circuit diagram of the Back-End Gate Array 47 in FIG. 14. The elements shown in FIG. 15 except the SRAM 135 and the Attribute Controller 45 are formed by a gate array. The Serializer 125 takes data from the serial port of VRAM 41 in 16- or 32-bit widths depending on the amount of VRAM installed and converts it to a serial stream of Pixel data.

FIG. 16 shows a detailed block diagram of the Serializer 125 shown in FIG. 15. As shown in FIG. 16, the Serializing circuit 145 receives the video data from the VRAM 41 in units of 32 bits (VD[0:31]) and performs a parallel-serial conversion of the data in units of 1 bit-per-pixel (PM0), 2 bits-per-pixel (PM[0:1]), 4 bits-per-pixel (PM[0:3]), 8 bits-per-pixel (PM[0:7]); and 16 bits-per-pixel (PM[0:15]).

Figure 17:
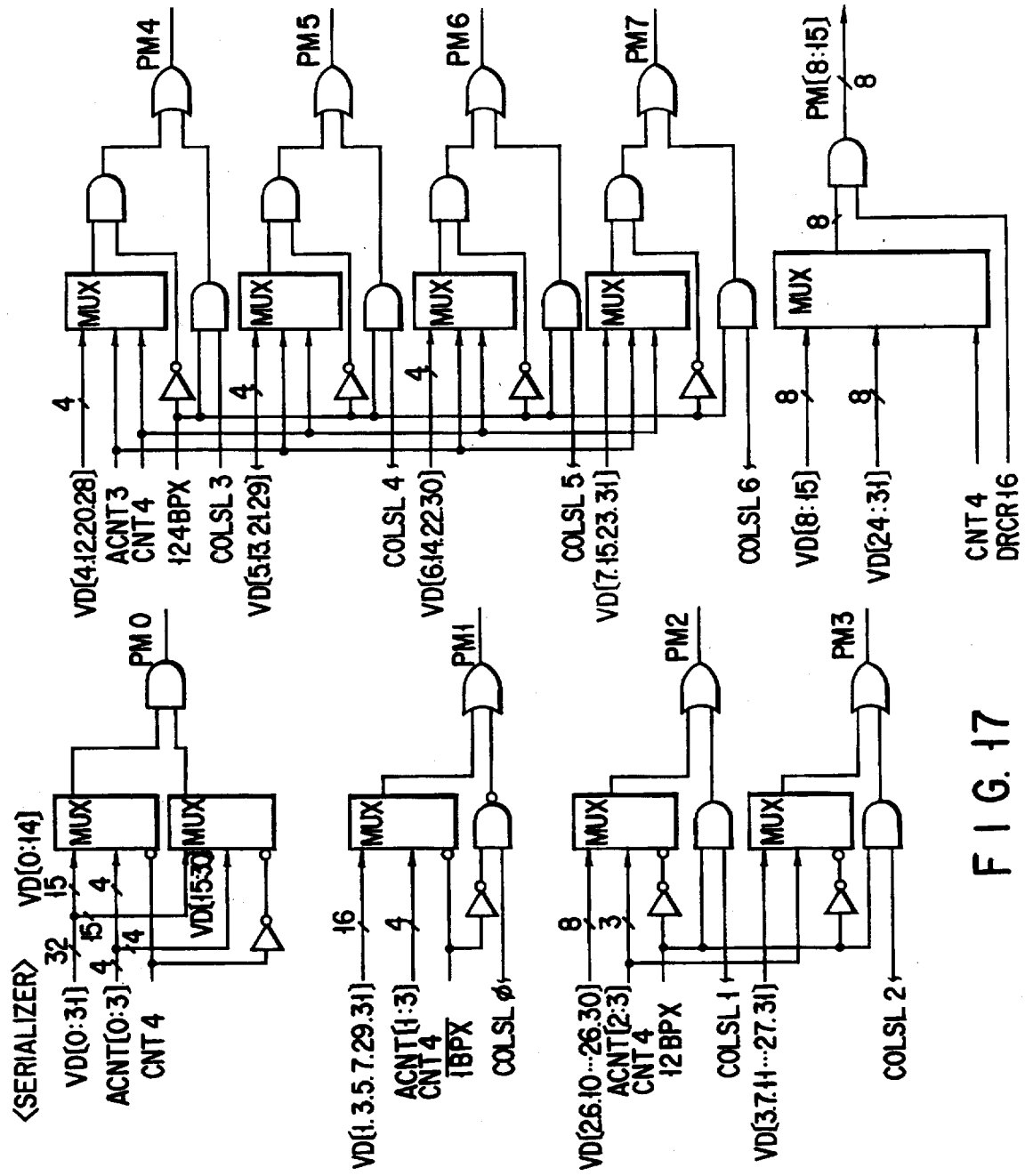
FIG. 17 depicts logic circuits of the serializer shown in FIG. 16.

FIG. 17 shows the logic circuit diagram of the serializer. Note that the logic diagram of the outputs PM[8:15] are omitted for the sake of brevity. Depending on the pixel size supplied from the Configuration Register 30 shown in FIG. 2A, the logic performs the parallel-serial conversion of the 32-bit video data and outputs in units of 1 bit-per-pixel data to 16 bits-per-pixel data. In FIG. 17, the pixel size information is supplied as CNT[0:4].

Referring again to FIG. 15, the Display Controller 139 is a conventional CRT controller. The Pipeline Latches 141 and 143 are provided for adjusting timing of the signals output from the Display Controller 139 and the Direct Color Mode Select 137.

The XGA register 127 comprises registers to control Color Lookup Table (CLUT) 129 to be described later, the SPRITE 131, and the Output register 133. Such registers are:

| Index | Name |
|---|---|
| 30H | Sprite Horizontal Start Lo |
| 31H | Sprite Horizontal Start Hi |
| 32H | Sprite Horizontal Preset |
| 33H | Sprite Vertical Start Lo |
| 34H | Sprite Vertical Start Hi |
| 35H | Sprite Vertical Preset |
| 36H | Sprite Control |
| 38H | Sprite Color 0 Red |
| 39H | Sprite Color 0 Green |
| 3AH | Sprite Color 0 Blue |
| 3BH | Sprite Color 1 Red |
| 3CH | Sprite Color 1 Green |
| 3DH | Sprite Color 1 Blue |
| 52H | Display Id and Comparator |
| 55H | Border Color |
| 60H | Sprite/Palette Index Lo |
| 61H | Sprite Index Hi |
| 62H | Sprite/Palette Index Lo with Prefetch |
| 63H | Sprite Index Hi with Prefetch |
| 64H | Palette Mask |
| 65H | Palette Data |
| 66H | Palette Sequence |
| 67H | Palette Red Prefetch Register |
| 68H | Palette Green Prefetch Register |
| 69H | Palette Blue Prefetch Register |
| 6AH | Sprite Data |
| 6BH | Sprite Prefetch Register |

A Direct Color Mode Selector 137 is provided to select a Direct Color Mode. FIGS. 19 and 20 show the XGA palette and Direct Color Mode, respectively. The Direct Color is a mode whereby the pixel values in the video memory directly specify the displayed color. In the XGA subsystem, 5 Red Bits and 6 Green Bits output from the Serializer are directly supplied to the D/A converter (DAC). In addition to 5 Red Bits, one more bit is added to the DAC. On the other hand, the 5 Blue Bits output from the Serializer and externally supplied three bits are supplied as the entry address to the Direct Color Palette. The contents of Blue Palette corresponding to the input address are output as 6 Blue Bits. Therefore, 18-bit RGB signals are supplied to the DAC.

The contents of the Color Lookup Table (CLUT) are as follows.

| Location (hex) B.C. = 0:1 | Red (hex) | Green (hex) | Blue (hex) |
|---|---|---|---|
| 80:0 | 0 | 0 | 0 |
| 81:1 | 0 | 0 | 2 |
| 82:2 | 0 | 0 | 4 |
| 83:3 | 0 | 0 | 6 |
| . | . | . | . |
| 9E:1E | 0 | 0 | 3C |
| 9F:1F | 0 | 0 | 3E |
| A0:20 | 0 | 0 | 0 |
| A1:21 | 0 | 0 | 2 |
| . | . | . | . |
| BE:3E | 0 | 0 | 3C |
| BF:3F | 0 | 0 | 3E |
| C0:40 | 0 | 0 | 0 |
| C1:41 | 0 | 0 | 2 |
| . | . | . | . |
| DE:5E | 0 | 0 | 3C |
| DF:5F | 0 | 0 | 3E |
| E0:60 | 0 | 0 | 0 |
| E1:61 | 0 | 0 | 2 |
| . | . | . | . |
| FE:7E | 0 | 0 | 3C |
| FF:7F | 0 | 0 | 3E |

The Direct Color Mode Selector 137 receives a DTCMDN signal indicating the Direct Color Mode. In response to this signal, the Direct Color Mode Selector 137 adds three bits to the 5 Blue Bits and an outputs 8-bit Blue signal to the CLUT 129.

The Sprite Controller 131 is used to display and control the position and image of the sprite, which is used as the cursor. The sprite is not available in 132-column text mode and VGA modes. The sprite is a 64×64 pixel image stored in the XGA Alpha/Sprite buffer. When active, it overlays the picture that is being displayed. Each pixel in the Sprite can take on four values, that can be used to achieve the effect of a colored marker of arbitrary shape. The sprite is stored as 2 bit packed pixels, using Intel format, in the Sprite Buffer. Address zero is at the top left corner of the Sprite. These 2-bit pixels determine that sprite appearance as shown in the table below:

| Bits(1:0) | Sprite Effect |
|---|---|
| 00 | Sprite Color 0 |
| 01 | Sprite Color 1 |
| 10 | Transparent |
| 11 | Complement |

Sprite Colors 0 and 1: These colors are set by writing to the Sprite Color Registers.

Transparent: The underlying pixel color is displayed.

Complement: The ones complement of the underlying pixel color is displayed.

The Sprite Buffer is written to by loading a number into the non-prefetch Sprite Index Hi and Sprite/Palette Index Lo registers which indicates the location of the first group of four sprite pixels to be updated (2 bits-per-pixel implies 4 pixels per byte). The first four pixels are written to the Sprite Data Register. This stores the sprite pixels in the sprite buffer and automatically increments the Index registers. A second write to the Sprite Data register then loads the next four Sprite pixels and so on.

When reading from the Sprite Buffer, the prefetch function is used. The index or address of the first sprite buffer location to be read is loaded into the Index registers. Note however that writing to either the Sprite Index Hi, or Sprite/Palette Index Lo register with prefetch will increment both registers as a single value. As a result, the first byte of the index should be written to a non-prefetch Index register, and the second byte to the other Index register with prefetch. For example: Sprite Index Hi (no prefetch) then Sprite/Palette Index Lo (with prefetch).

The action of writing to an Index register with prefetch, causes the Sprite data stored at the location specified in the index registers to be stored in the holding register and subsequently increments the index registers as a single value. The action of reading the Sprite Data Register returns the four Sprite pixels which were prefetched, and causes the holding register to be loaded with the next four Sprite Pixels. Another read from the Sprite Data register then returns the next 4 sprite pixels, and so on.

The sprite and the palette are written and read using the same hardware registers, so any task updating either of these on an interrupt thread must save and restore the following register:

Sprite/Palette Index Lo Register (Index:60)
Sprite Index Hi Register (Index:61)
Palette Sequence Register (Index:66)
Palette Red Prefetch Register (Index:67)
Palette Green Prefetch Register (Index: 68)
Palette Blue Prefetch Register (Index:69)
Sprite Prefetch Register (Index:6B)

The Sprite position is controlled by two types of registers: Start and Preset. The start registers control where the first displayed sprite pixel appears on the screen, and the preset registers control which sprite pixel is first displayed within the 64×64 Sprite Definition. Using these registers, the sprite can be made to appear at any point in the picture area. If the sprite overlaps any edge, the part of the sprite outside the picture area is not visible.

The position of the sprite is then controlled by 2 separate controls, as follows:

Sprite Start Registers: The sprite is positioned on the display surface by specifying the position of the upper left corner of the sprite definition relative to the upper left corner of the visible bitmap using the Horizontal and Vertical Start registers.

Sprite Preset Registers: The Sprite Start registers only accept positive values, and cannot be used to move the sprite partially off the display surface at the left and top edges. The Sprite Preset Registers are used to offset the start of the displayed sprite definition horizontally and/or vertically relative to the loaded definition.

For example, if it is desired to display a 64×64 sprite with the leftmost 32 pixels outside the left edge of the display surface, set the Horizontal Start Register to 0, and the Horizontal Preset Register to 32. The start position has now been preset to the center of the loaded definition, giving the desired effect. The Sprite Preset can also be used to display a sprite smaller than 64×64.

Upon finishing the drawing, the Sprite Controller 131 issues an interrupt signal (SPCLT) to the Host CPU.

The SRAM 135 serves as a sprite buffer which stores the sprite image while in Extended Graphics modes.

The present invention has been described in detail in connection with the preferred embodiments. These embodiments, however, are merely for example only and the invention is not limited thereto. It will be easily understood by those skilled in the art that other variations and modifications may be easily made within the scope of the invention as defined by the appended claims. In addition, while the present invention has been described as utilized in a 34020 Graphic System Processor (GSP) to provide for compatibility with VGA and XGA, it will be understood that the foregoing description of the present invention may easily adapted for use with other GSPs in order to provide compatibility with other graphic standards. Also, adaptation of the present invention to non-graphics applications may also be made while staying within the scope of the claims.

The Output Circuit 133 outputs the display timing signals such as Horizontal Sync signal and Vertical Sync signal output from the Display Controller 139 and delayed by the Pipeline Latches 141 and 143 as well as the palette data (PD[0:17]) output from the CLUT 129.

Appendix:
This is a map of the 34020 memory:
Note:
h-hexdecimal
b-binary
"no following letters"-decimal

| | Description |
|---|---|
| DRAM Map: | |
| 0000 0000h | Starting address For 4MB DRAM |
| 0010 0000h | Start of 1KB XGA State A register read/write The host address of this register is 0Ch. |
| 0010 2000h | Start of 1KB XGA State B register read/write The host address of this register is 0Dh. |
| 0010 4000h | XGA and VGA Indexed Registers (152 Bytes) |
| 0010 4020h | XGA Index Register 04h. Auto-Configuration Register Read Only by the host processor. |
| 0010 4080h | XGA Index Register 10h. Horizontal Total Lo. CIT 7. This is also the VGA CRTC register 01h (Horizontal Display Enable End). |
| 0010 4088h | XGA Index Register 11h. Horizontal Total Hi. Returns a zero on host processor reads. |
| 0010 4090h | XGA Index Register 12h. Horizontal Display End Lo. CIT 7. This is also the VGA CRTC Register 01h (Horizontal Display Enable End). |
| 0010 4098h | XGA Index Register 13h. Horizontal Display End Hi. Returns a zero on host processor reads. |
| 0010 40A0h | XGA Index Register 14h. Horizontal Blanking Start Lo. CIT 7. This is also the VGA CRTC register 02h (Start Horizontal Blanking). |
| 0010 40A8h | XGA Index Register 15h. Horizontal Blanking Start Hi. Return a zero on host processor reads. |
| 0010 40B0h | XGA Index Register 16h. Horizontal Blanking End Lo. CIT 7. This is also the VGA CRTC register 03h (End Horizontal Blanking). |
| 0010 40B8h | XGA Index Register 17h. Horizontal Blanking End Hi. Returns a zero on host processor reads. |
| 0010 40C0h | XGA Index Register 18h. Horizontal Sync Pulse Start Lo. CIT 7. This is also the VGA CRTC register 04h (Start Horizontal Retrace Pulse). |
| 0010 40C8h | XGA Index Register 19h. Horizontal Sync |

| | Description |
|---|---|
| | Pulse Start Hi. Returns a zero on host processor reads. |
| 0010 40D0h | XGA Index Register 1Ah. Horizontal Sync Pulse End Lo. CIT 7. |
| 0010 40D8h | XGA Index Register 1Bh. Horizontal Sync Pulse End Hi. Returns a zero on host processor reads. |
| 0010 40E0h | XGA Index Register 1Ch. Horizontal Sync Position. CIT 7. |
| 0010 40F0h | XGA Index Register 1Eh. Horizontal Sync Position. CIT 7. Returns a zero on host processor reads. |
| 0010 4100h | XGA Index Register 20h. Vertical Total Lo. CIT 8. This is also the VGA CRTC register 06h (Vertical Total). |
| 0010 4108h | XGA Index Register 21h. Vertical Total Hi. CIT 8. |
| 0010 4110h | XGA Index Register 22h. Vertical Display End Enable Lo. CIT 8. This is also the VGA CRTC register 12h (Vertical Display Enable End). |
| 0010 4118h | XGA Index Register 23h. Vertical Display End Enable Hi. CIT 8. Bits [0:2] maps to bits [0:2] of the Miscellaneous Output Register. These bits are emulated. Please see Skunk XGA register definitions. The maximum value of this register is 7. |
| 0010 4120h | XGA Index Register 24h. Vertical Blanking Start Lo. CIT 8. This is also the VGA CRTC register 15h (Start Vertical Blanking). |
| 0010 4128h | XGA Index Register 25h. Vertical Blanking Start Hi. CIT 8. The maxim value of this register is 7. |
| 0010 4130h | XGA Index Register 26h. Vertical Blanking End Lo. CIT 8. This is also the VGA CRTC register 16h (End Vertical Blanking). |
| 0010 4138h | XGA Index Register 27h. Vertical Blanking End Hi. CIT 8. The maximum value of this register is 7. |
| 0010 4140h | XGA Index Register 28h; Vertical Sync Pulse Start Lo. CIT 8. This is also the VGA CRTC register 10h (Vertical Retrace Start). |
| 0010 4148h | XGA Index Register 29h. Vertical Sync Pulse Start Hi. CIT 8. Bits [0:2] maps to bits [0:2] of the VGA CRTC register 7h (Overflow). These bits are emulated. Please see Skunk XGA register definitions. The maximum value of this register is 7. |
| 0010 4150h | XGA Index Register 2Ah. Vertical Sync Pulse End. CIT 8. Bits [0:7] of the VGA CRTC register 11h (Vertical Retrace End). These bits are emulated. Please see Skunk XGA register definitions. |
| 0010 4160h | XGA Index Register 2Dh. Vertical Line Compare Hi. CIT 10. This is also the VGA CRTC register 18h (Line Compare). |
| 0010 4168h | XGA Index Register 2Dh. Vertical Line Compare Hi. CIT 10. Bits [0:7] of the VGA CRTC register 17h (CRT Mode Control). These bits are emulated. Please see Skunk XGA register definitions. |
| 0010 4200h | XGA Index Register 40h. Display Pixel Map Offset Lo. CIT 11. This is also the VGA CRTC register Dh (Start Address Low). |
| 0010 4208h | XGA Index Register 41h. Display Pixel Map Offset Mid. CIT 11. This is also the VGA CRTC register Ch (STart Address High). |
| 0010 4210h | XGA Index Register 42h. Display Pixel Map Offset Hi. CIT 11. Bits [0:7] maps to bits [0:7] of the VGA Sequencer register 3 (Character Map Select Register). These bits are emulated. Please see Skunk XGA register definitions. |
| 0010 4218h | XGA Index Register 43h. Display Pixel Map Width Lo. CIT 12. This is also the VGA CRTC register 13h (Offset). |
| 0010 4220h | XGA Index Register 44h. Display Pixel Map Width Hi. CIT 12. |
| 0010 4280h | XGA Index Register 50h. Display Control 1. CIT 17. |
| 0010 4288h | XGA Index Register 51h. Display Control 2. CIT 17. |
| 0010 42A0h | XGA Index Register 54h. Clock Frequency Select. CIT 0. |
| 0100 4380h | XGA Index Register 70h. External Clock Select Register. CIT 0. |
| 0010 4408h | VGA Sequencer Index Register 1. Clocking Mode Register. CIT 1. |
| 0010 4418h | VGA Sequencer Index Register 3. Character Map Select Register. CIT 2. |
| 0010 4428h | VGA CRTC Index Register 5. End Horizontal Retrace. CIT 7. |
| 0010 4440h | VGA CRTC Index Register 8. Preset Row Scan. CIT 10. |
| 0010 4448h | VGA CRTC Index Register 9. Maximum Scan Line. CIT 14. |
| 0010 4450h | VGA CRTC Index Register Ah. Cursor Start. CIT 9. |
| 0010 4458h | VGA CRTC Index Register Bh. Cursor End. CIT 9. |
| 0010 4470h | VGA CRTC Index Register Eh. Cursor Location High. CIT 9. |
| 0010 4478h | VGA CRTC Index Register Fh. Cursor Location Low. CIT 9. |
| 0010 44A0h | VGA CRTC Index Register 14h. Underline Location. CIT 14. |
| 0010 44B8h | VGA CRTC Index Register 17h. CRT Mode Control. CIT 13. |
| 0010 44C0h | Starting address for 104 consecutive memory bytes. |
| 0010 4800h | Starting address for the XGA Memory Mapped Register. (173 Bytes) |
| 0010 4800h | Page Directory Base Address. Offset 0h Bytes. 32 Bits |
| 0010 4820h | Current Virtual Address (Read Only). Offset 4h Bytes. 32 Bits. |
| 0010 4860h | State A Length (Read Only). Offset Ch Bytes. 8 Bits |
| 0010 4868h | State B Length (Read Only). Offset Dh Bytes. 8 Bits |
| 0010 48A0h | Pixel Map 0 Base Pointer. Offset 14h Bytes. 32 Bits |
| 0010 48C0h | Pixel Map 0 Width. Offset 18h Bytes. 16 Bits |
| 0010 48D0h | Pixel Map 0 Height. Offset 1Ah Bytes. 16 Bits |
| 0010 48E0h | Pixel Map 0 Format. Offset 1Ch Bytes. 8 Bits |
| 0010 4900h | Bresenham Error Term (Read/Write). Offset 20h Bytes. 16 Bits but high order word back fills with FFFFh when any value is inputted into the lower word. |
| 0010 4920h | Bresenham k1. Offset 24h Bytes. 16 Bits |
| 0010 4940h | Bresenham k2. Offset 28h Bytes. 16 Bits |
| 0010 4960h | Direction Steps. Offset 2Ch Bytes. CIT 21 upon host write to high byte (Offset 2Fh Bytes) 0010 4978h (GSP). 32 Bits. No Motorola Format support. |
| 0010 4A40h | Foreground Mix. Offset 48h Bytes. 8 Bits |
| 0010 4A48h | Background Mix. Offset 49h Bytes. 8 Bits |
| 0010 4A50h | Destination Color Compare Condition. Offset 4Ah Bytes. 8 Bits |

| | Description |
|---|---|
| 0010 4A60h | Destination Color Compare Value. Offset 4Ch Bytes. 32 Bits. |
| 0010 4A80h | Pixel Bit Mask. Offset 50h Bytes. 32 Bits |
| 0010 4AA0h | Carry Chain Mask. Offset 54h Bytes. 32 Bits |
| 0010 4AC0h | Foreground Color Register. Offset 58h Bytes. 32 Bits |
| 0010 4AE0h | Background Color Register. Offset 5Ch Bytes. 32Bits |
| 0010 4B00h | Operation Dimension 1. Offset 60h Bytes. 16 Bits |
| 0010 4B10h | Operation Dimension 2. Offset 62h Bytes. 16 Bits |
| 0010 4B60h | Mask Map Origin X Offset. Offset 6Ch Bytes. 16 Bits |
| 0010 4B70h | Mask Map Origin Y Offset. Offset 6Eh Bytes. 16 Bits |
| 0010 4B80h | Source Map X Address (Read/Write). Offset 70h Bytes. 16 Bits |
| 0010 4B90h | Source Map Y Address (Read/Write). Offset 72h Bytes. 16 Bits |
| 0010 4BA0h | Pattern Map X Address (Read/Write). Offset 74h Bytes. 16 Bits |
| 0010 4BB0h | Pattern Map Y Address (Read/Write). Offset 76h Bytes. 16 Bits |
| 0010 4BC0h | Destination Map X Address (Read/Write). Offset 78h Bytes. 16 Bits |
| 0010 4BD0h | Destination Map Y Address (Read/Write). Offset 7Ah Bytes. 16 Bits |
| 0010 4BE0h | Pixel Operation. Offset 7Ch Bytes. CIT 22 upon host write to high byte (Offset 7Fh Bytes) 0010 4BF8h (GSP). 32 Bits. No Motorola Format support. |
| 0010 4C20h | Pixel Map 1 Base Pointer. Offset 84h Bytes. 32 Bits |
| 0010 4C40h | Pixel Map 1 Width. Offset 88h Bytes. 16 Bits |
| 0010 4C50h | Pixel Map 1 Height. Offset 8Ah Bytes. 16 Bits |
| 0010 4C60h | Pixel Map 1 Format. Offset 8Ch Bytes. 8 Bits |
| 0010 4CA0h | Pixel Map 2 Base Pointer. Offset 94h Bytes. 32 Bits |
| 0010 4CC0h | Pixel Map 2 Width. Offset 98h Bytes. 16 Bits |
| 0010 4CD0h | Pixel Map 2 Height. Offset 9Ah Bytes. 16 Bits |
| 0010 4CE0h | Pixel Map 2 Format. Offset 9Ch Bytes. 8 Bits |
| 0010 4D20h | Pixel Map 3 Base Pointer. Offset A4h Bytes. 32 Bits |
| 0010 4D40h | Pixel Map 3 Width. Offset A8h Bytes. 16 Bits |
| 0010 4D50h | Pixel Map 3 Height. Offset AAh Bytes. 16 Bits |
| 0010 4D60h | Pixel Map 3 Format. Offset ACh Bytes. 8 Bits |
| 0010 4D68h-001F FFFFh | 3.87 MB of Program Space. The last 128K of this Memory is double mapped to FFFX XXXXh (Same as 01FX XXXXh Bit Address) |
| 0800 0000-0FFF FFFFh | 16 MB PC Host memory location for Bus Mastership |
| B800 0000h | Start of GSP miscellaneous Registers |
| B800 0100h | VGA Sense Bit (Input st 0) (DACINI) Bit 3 |
| B800 0110h | Pixel Width and X-Zoom Mode Control (Old 8bit/4bit Sel) |
| B800 0180h | Brd Conf D(RW) |
| B800 0188h | Unpack Pack Pixel Register (PPackReg) |
| B800 0190h | Interrupt Select, Reset |
| B800 0198h (3) | Host Processor Hold Register, Reset |
| B800 01A0h (0) | Clock Select DotClkst |
| B800 01A8h (1) | Clock Control (Dividers) VClkDiv |
| B800 01B0h (2) | Set Line Comapre, Reset, Bit 0 only |
| B800 01C0h (0) | Bill Reg, Horz. Sync Delay, and Attr Clk Enable |
| B800 01C8h (1) | Misc. Out (RO) (CIT0) |
| B800 01D0h (2) | Input Status 0 & 1 (RO) Bit 4 of Input St 0 is in DACINI |
| B800 01D8h (3) | CRTC 7 (RW) (CIT 8) |
| B800 01E0h (0) | CRTC 11 (RW) (CIT8) |
| B800 01E8h (1) | GC Mode Reg 5 (RO) (CIT16) |
| B800 01F0h (2) | GC Misc Reg 6 (RO) (CIT 16) |
| B800 01F8h (3) | Att Mode Control 10 (RW) (CIT 3) |
| B800 0200h (0) | Att Pix Pan 13 (RW) (CIT 6) |
| B800 0220h | 32 Bit Internal Latch for VGA (32) (RO) |
| B800 0240h | 23 Bit CIT Mask Reg |
| B800 0260h | 23 Bit CIT Status Reg (RO) |
| B800 0280h | 32 Bit Pixel Write Mask Reg (RO) Loaded w/34020 Load Write Mask Operation |
| B800 02A0h (0) | 3 Bit Safety Latch |
| B800 02A8h (1) | Donger Horz Sync Start Value |
| B800 02B0h (2) | Donger Horz Sync End Value |
| B800 02B8h (3) | Donger Vert Sync Start Value (Lower 8 Bits) |
| B800 02C0h (0) | Donger Vert Sync Start Value (Upper 3 Bits) |
| B800 02C8h (1) | Donger Vert Sync End Value (Lower 8 Bits) |
| B800 02D0h (2) | Donger Vert Sync End Value (Upper 3 Bits) |
| B800 02D8h (3) | XGA Operating Mode Register, 21X0h (RO) (CIT 17) |
| B800 02E0h (0) | XGA Interrupt Status Register, 21X5h (D) see Int Sel Reg. |
| B800 02F0h (2) | XGA Memory Interrupt Status Register, 21X7h (D) (CIT 15) |
| B800 02F8h (3) | XGA Aperture Index Register, 21X8h (RO) and XGA Aperture Control Register, 21X1 (RO) (No CIT. Document Problems) |
| B800 0300h | XGA POS Register 2, ROW Address & IODA (RO) (No CIT. Document Problems) |
| B800 0308h (1) | XGA POS Register 5, 1 MB Base Address (RO) (No. CIT. Document problems) |
| B800 0310h (2) | Bus Master Read Swap Register |
| B800 0318h (3) | Bus Master Read Swap Register |
| B800 0320h (0) | Co-Processor Control Register (XGA Memory Map 11) (CIT 19) (Dual Ported, Read/Write) |
| B800 0328h (1) | TLB CIT Snoop Status (RO) |
| B800 0330h (2) | TLB Snoop Source Page Table Address Low |
| B800 0338h (3) | TLB Snoop Source Page Table Address High |
| B800 0340h (0) | TLB Snoop Destination Page Table Address Low |
| B800 0348h (1) | TLB Snoop Destination Page Table Address High |
| B800 0350h (2) | TLB Snoop Source Page Directory Address Low |
| B800 0358h (3) | TLB Snoop Source Page Directory Address High |
| B800 0360h (0) | TLB Snoop Destination Page Directory Address Low |
| B800 0368h (1) | TLB Snoop Destination Page Directory Address High |
| B800 0370h (2) | Miscellaneous Bus Master Register |
| B800 0378h (3) | Master Punch Out Register |
| B800 0380h (0) | Master Bus Fault Count Register |
| B800 0400h | Starting Address for 64 byes of the Back-end Gate Array |
| B800 0400h | Sprite Horizontal Start Lo (30) |
| B800 0408h | Sprite Horizontal Start Hi (31) |
| B800 0410h | Sprite Vertical start Lo (33) |
| B800 0018h | Sprite Vertical Start Hi (34) |
| B800 0420h | Sprite Horizontal Preset (32) |
| B800 0428h | Sprite Vertical Preset |
| B800 0430h | Sprite Control |
| B800 0438h | Display Id and Comparator (52) |
| B800 0440h | Sprite Color 0 Red (38) |
| B800 0448h | Sprite Color 0 Green (39) |
| B800 0450h | Sprite Color 0 Blue (3A) |
| B800 0458h | Border Color (55) |
| B800 0460h | Sprite Color 1 Red (3B) |
| B800 0468h | Sprite Color 1 Green (3C) |

-continued

| | Description |
|---|---|
| B800 0470h | Sprite Color 1 Blue (3D) |
| B800 0478h | Palette Sequencer (66) |
| BB00 0480h | Sprite/Palette Index Lo (60) |
| B800 0488h | Sprite Index Hi |
| B800 0490h | Sprite/Palette index Lo with Prefetch (62) |
| B800 0498h | Sprite Index Hi with Prefetch (63) |
| B800 04A0h | Palette Red Prefetch Register (67) |
| B800 04A8h | Palette Green Prefetch Register (68) |
| B80C 04B0h | Palette Blue Prefetch Register (69) |
| B800 04B8h | Palette Data (65) |
| B800 04C0h | Sprite Data (6A) |
| B800 04C8h | Palette Mask (64) |
| B800 04D0h | Sprite Prefetch Register (6B) |
| B800 04P8h | Sprite Control Register (Shadow): To Select IBM mode or SKUNK mode |
| VRAM Map: | |
| C7C0 0000h | Starting Address for VRAM Bank 0. In VGA and XGA modes, this bank is invisible to the host processor. It is used for emulation only. |
| C800 0000h | Starting Address for VRAM Bank 1. In VGA and XGA modes, this bank is the first 512K of VRAM. |
| C840 0000h | Starting Address for VRAM Bank 2. In VGA and XGA modes, this bank is the second 512K of VRAM. |

What is claimed is:

1. An interface for interfacing a host processor to a graphics system processor, the host processor and graphics system processor being coupled to a common bus, the interface comprising:

a memory having at least a first area accessible by the host processor and a second area accessible by the graphics system processor;

a computer program operating on the host processor for generating memory addresses and data elements associated with the memory addresses;

a memory address translator for translating addresses of the first area into addresses of the second area;

a graphics controller for storing the data elements into memory locations defined by the translated memory addresses; and a bus master arbitrator for arbitrating occupation and release of the common bus between the host processor and the graphics system processor, the bus master arbitrator including means for producing a retry signal to the graphics system processor in response to a condition that the common bus is busy, and means for counting occurrences of the retry signal and for producing a bus fault signal to the graphics system processor when the count value reaches a predetermined value.

2. The interface according to claim 1, wherein the graphics system processor consists of a Texas Instrument TMS34020 graphics system processor, the host processor consists of an 80×86-compatible microprocessor, and the computer program consists of a Video Graphics Array (VGA) operating system including an Extended Graphics Array (XGA) function.

3. The interface according to claim 1, wherein the memory address translator comprises:

a plurality of XGA registers for storing XGA control information;

a plurality of hidden registers for storing translation state data, the hidden registers being located at normally unused I/O addresses and being writable from the host processor using a predetermined sequence of instructions;

an address multiplexer having inputs for receiving the generated memory addresses and a plurality of I/O control signals, the address multiplexer for translating the generated memory addresses and plurality of I/O control signals into the translated memory addresses; and a controller for controlling the address multiplexer responsive to the XGA control information and translation state data.

4. The interface according to claim 1, wherein the graphics controller comprises:

a plurality of hidden registers; and pixel swapping means, responsive to the hidden registers, for selectively swapping Intel order to Motorola order and Motorola order to Intel order.

5. In a computer system comprising a host processor, a coprocessor, and memory at least partially addressable by both the host processor and the coprocessor through a common bus, the memory having a first area accessible by the host processor and a second area accessible by the coprocessor, an interface for interfacing an operating system operating on the host processor with the coprocessor, the interface comprising:

means for translating memory addresses of the first area into memory addresses of the second area;

means for storing data elements generated by the operating system into the translated memory addresses; and a bus master arbitrator for arbitrating occupation and release of the common bus between the host processor and the coprocessor, the bus master including means for counting time data and for producing a time-out signal to the coprocessor when the counted time value reaches a preset value.

6. The interface according to claim 5, wherein the means for counting time data comprises a punch-out counter, activated when the coprocessor obtains control of the common bus, for counting time data and producing the time-out signal, wherein in response to the time-out signal, the coprocessor releases the common bus.

7. The interface according to claim 5, further comprising a coprocessor-to-bus converter, coupled between the coprocessor and the common bus, for delaying coprocessor read/write control signals and outputting thereby bus memory command signals onto the common bus in accordance with timing requirements of the common bus.

8. The interface according to claim 7, further comprising a DMA controller, coupled to the bus master arbitrator and to the host processor, for isolating the host processor from the common bus in response to a DMA request signal from the bus master arbitrator.

9. The interface according to claim 5, further comprising GSP decode logic, coupled to the bus master arbitrator and responsive to host memory addresses transmitted on the common bus, for decoding the host memory addresses and issuing in response thereto an enable signal to the bus master arbitrator.

10. In a computer system comprising a host processor, a coprocessor, and memory at least partially addressable by both the host processor and the coprocessor through a common bus, the memory having a first area accessible by the host processor and a second area accessible by the coprocessor, an interface for interfacing an operating system operating on the host processor with the coprocessor, the interface comprising:

means for translating memory addresses of the first area into memory addresses of the second area;

means for storing data elements generated by the operating system into the translated memory addresses; and a bus master arbitrator for arbitrating occupation and release of the common bus between the host processor and the coprocessor, the bus master arbitrator including means for producing a retry signal to the coprocessor when the common bus is busy, and means for counting occurrences of the retry signal and for producing a bus fault signal when the count value reaches a predetermined value.

11. The interface according to claim 10, wherein the bus master arbitrator further comprises a punch-out counter, coupled to the coprocessor and activated when the coprocessor obtains control of the bus, for producing a bus release signal to the coprocessor after a predetermined period of time.

* * * * *